(12) United States Patent
Yeh et al.

(10) Patent No.: US 9,966,861 B1
(45) Date of Patent: May 8, 2018

(54) ACTIVE CLAMP CONVERTER AND CONTROL METHOD FOR THE SAME

(71) Applicant: ACBEL POLYTECH INC., New Taipei (TW)

(72) Inventors: Chia-An Yeh, New Taipei (TW); Shu-Wei Chuang, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 0 days. days.

(21) Appl. No.: 15/601,586

(22) Filed: May 22, 2017

(51) Int. Cl.
  *H02M 3/33* (2006.01)
  *H02M 3/335* (2006.01)

(52) U.S. Cl.
  CPC ... *H02M 3/33515* (2013.01); *H02M 3/33592* (2013.01)

(58) Field of Classification Search
  CPC ............... H02M 1/00; H02M 3/33538; H02M 2001/0025; H02M 2001/0009
  USPC ...... 363/17, 20, 21.03, 89, 97, 21.08, 21.12, 363/21.18, 56.12
  See application file for complete search history.

(56) References Cited

U.S. PATENT DOCUMENTS

| | | | | |
|---|---|---|---|---|
| 5,282,123 A * | 1/1994 | Boylan | ............. | H02M 3/33569 363/21.1 |
| 5,303,138 A * | 4/1994 | Rozman | ............ | H02M 3/33569 363/127 |
| 5,991,171 A * | 11/1999 | Cheng | ................ | H02M 3/33507 363/21.03 |
| 7,738,266 B2 * | 6/2010 | Jacques | ............. | H02M 3/33553 363/21.02 |
| 9,013,106 B2 * | 4/2015 | Zhang | .................. | H05B 41/295 315/112 |

* cited by examiner

*Primary Examiner* — Rajnikant Patel
(74) *Attorney, Agent, or Firm* — Muncy, Geissler, Olds & Lowe, P.C.

(57) ABSTRACT

A control method for an active clamp converter has steps of: detecting a state of the load; when the state of the load is a light-load state, using a skipping mode to control a switch frequency of a master switch; when the state of the load is not the light-load state, using an ACF mode to control the switch frequency of the master switch. In the skipping mode, the switch frequency is decreased when the state of the load is getting light, thus providing an energy efficiency power saving function for the light-load state. In the ACF mode, the master switch is controlled to turn on while a reverse current is generated, thus the switching loss of the master switch is reduced.

20 Claims, 20 Drawing Sheets

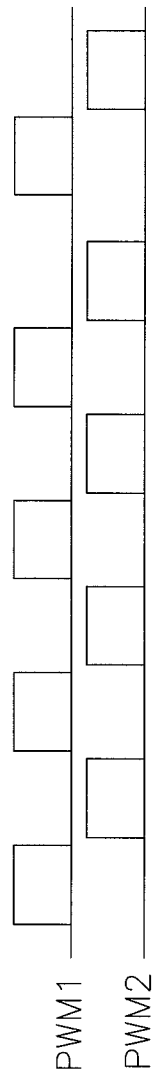
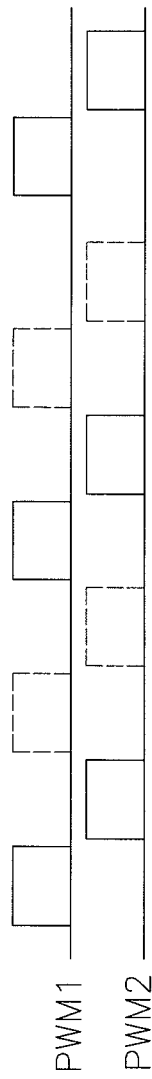
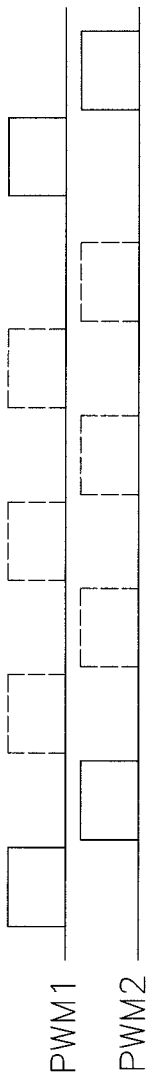

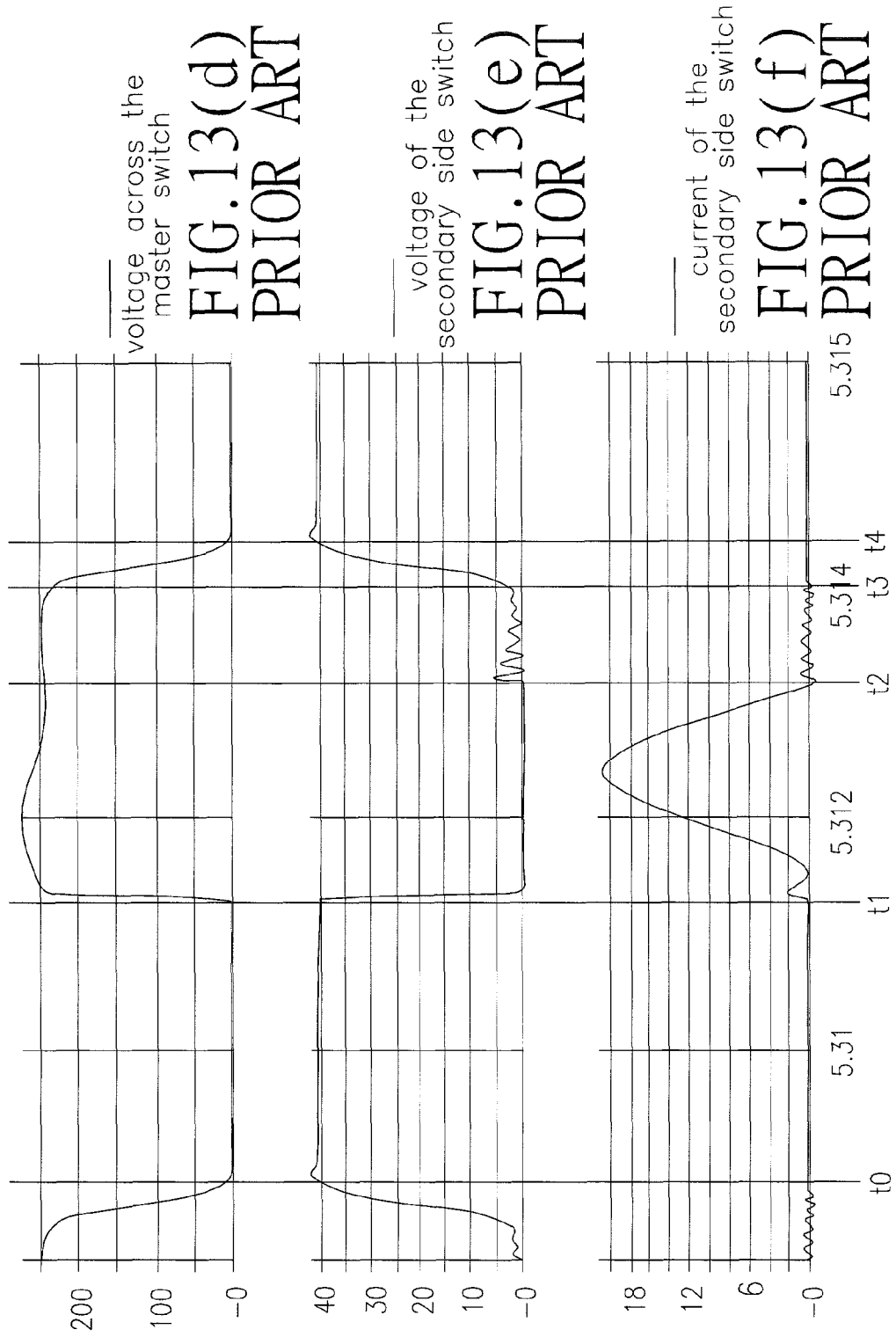

ACTIVE CLAMP CONVERTER AND CONTROL METHOD FOR THE SAME

BACKGROUND OF THE INVENTION

1. Field of the Invention

The present invention relates to a converter, especially an active clamp converter and a control method for the same.

2. Description of the Prior Arts

With reference to FIGS. 13(a) to 13(f) and FIG. 14, an active clamp converter has a primary side and a secondary side. The primary side is coupled to an alternating current power supply 110 and is composed of an electromagnetic interference filter 121, a rectifier 122, a master switch Q1, an auxiliary switch Q2, a magnetic inductor L1, a primary side leakage inductor L2, a primary side capacitor C1 and a primary side coil W1.

The electromagnetic interference filter 121 is electrically connected between the alternating current power supply 110 and the rectifier 122 to provide electromagnetic isolation. The rectifier 122, having a DC positive terminal and a DC negative terminal, receives an alternating current from the alternating current power supply 110 and rectifies the alternating current to a direct current.

The magnetic inductor L1 is connected in parallel to the primary side coil W1, and then both are further connected to the DC positive terminal of the rectifier 122.

The auxiliary switch Q2 is connected in series between the primary side capacitor C1 and the master switch Q1. One terminal, which is not connected to the auxiliary switch Q2, of the primary side capacitor C1 is connected to the DC positive terminal of the rectifier 122. One terminal, which is not connected to the auxiliary switch Q2, of the master switch Q1 is connected to the DC negative terminal of the rectifier 122.

A first terminal of the primary side leakage inductor L2 is electrically connected to the magnetic inductor L1. A second terminal of the primary side leakage inductor L2 is electrically connected to the master switch Q1 and the auxiliary switch Q2.

The master switch Q1 and the auxiliary switch Q2 are controlled by a primary side controller 123. The primary side controller 123 generates two control signals transmitted to control terminals of the master switch Q1 and the auxiliary switch Q2 by two drive units 124 respectively to turn on/off the master switch Q1 and the auxiliary switch Q2.

The secondary side of the active clamp converter is electrically connected to a load 130 and is composed of a secondary side coil W2, a secondary side switch Q3 and a secondary side output capacitor C2. A first terminal of the secondary side coil W2 is connected to a first terminal of the secondary side output capacitor C2, while a second terminal of the secondary side coil W2 is connected to a second terminal of the secondary side output capacitor C2 through the secondary side switch Q3. The secondary side switch Q3 is controlled by a secondary side controller 125. The first terminal and the second terminals of the output capacitor C2 are connecter to the load 130. The secondary side controller 125 generates a control signal to turn on/off the secondary side switch Q3.

As shown in FIGS. 13(a) to 13(f) and FIG. 15, during time interval t0 to t1, the master switch Q1 is turned on, and the auxiliary switch Q2 and the secondary side switch Q3 are turned off. Thus the current of the alternating current power supply 110 being electromagnetically filtered and rectified flows through the magnetic inductor L1, the primary side leakage inductor L2 and the master switch Q1 to energize the magnetic inductor L1.

As shown in FIGS. 13(a) to 13(f) and FIGS. 16 to 18, during the time interval t1 to t2, corresponding to FIG. 16 and FIG. 18, the master switch Q1 is turned off, the auxiliary switch Q2 and the secondary side switch Q3 are turned on, and thus the magnetic inductor L1 starts to deenergize and forms a loop with the primary side coil Who transfer electric energy to the secondary side for powering the load 130. Moreover, an oscillating circuit is formed by the magnetic inductor L1, the primary side leakage inductor L2, the auxiliary switch Q2 and the primary side capacitor C1, during the time interval between t2 and t3, as shown in FIG. 18. Because the magnetic inductor L1 has already deenergized, there is no current on the secondary side, so the secondary side switch Q3 is turned off and only the auxiliary switch Q2 is turned on.

As shown in FIGS. 13(a) to 13(f) and FIG. 19, during the time interval t2 to t3, the master switch Q1, the auxiliary switch Q2 and the secondary side switch Q3 are all turned off, and the current of the oscillating circuit is in an anti-clockwise direction. However, the auxiliary switch Q2 is cut-off, the oscillating circuit cannot maintain its oscillating operation and the magnetic inductor L1 sustains the current, thus a reverse current is generated flowing through the master switch Q1. Meanwhile, because the flowing of the reverse current is via a body diode of the master switch Q1, a voltage across the master switch Q1 is equal to the forward turn-on voltage of the body diode, about 0.7 volt. The switching loss can be reduced if the voltage across the master switch Q1 approaches zero volt. Thus the common active clamp converter generates the reverse current by the capacitor-inductance oscillating circuit to reduce the voltage across the master switch Q1 to reduce the switching loss.

But the current level of the magnetizing current of the common active clamp converter changes with the state of the load 130. Generally, the current level is increased with the state of the load 130. When the state of the load 130 exceeds a first threshold value, the current level of the magnetizing current of the primary side of the active clamp converter may exceed an amplitude of the current in the oscillating circuit. Therefore, the minimum value of the current in the oscillating circuit will exceed zero ampere. Therefore, when the state of the load 130 exceeds the first threshold value, there is no reverse current generated. Without the reverse current, the body diode of the master switch Q1 will not be turned on. The voltage across the master switch Q1 will not be decreased and switching loss of the master switch Q1 is unable to be reduced.

SUMMARY OF THE INVENTION

The present invention provides an active clamp converter and a control method for the active clamp converter in order to decrease the switching loss in the heavy load state and the light load state. The control method is applied to control a master switch and an auxiliary switch in a primary side of the active clamp converter, and includes the steps of:

detecting a state of a load of the active clamp converter;
determining whether the state of the load is a light-load state or not;
when the state of the load is the light-load state, a skipping mode is applied to generate a master control signal and an auxiliary control signal; wherein the master control signal controls the master switch to turn on and off, and the auxiliary control signal controls the auxiliary switch to turn on and off; wherein in the skipping mode, the switch frequencies of the master switch and the auxiliary switch are decreased when the state of the load is getting light;

when the state of the load is not the light-load state, an active clamp forward (ACF) mode is applied to generate the master control signal and the auxiliary control signal; wherein in the ACF mode the switch frequencies of the master switch and the auxiliary switch are adjusted for generating a reverse current when the state of the load is getting heavy, and the master switch is controlled to be turned on by the reverse current.

The present invention provides an active clamp converter connected between an alternating current (AC) power supply and a load, the active clamp converter comprising:

a rectifier having a DC positive terminal and a DC negative terminal;

an electromagnetic interference filter electrically connected between the alternating current power supply and the rectifier;

a primary side coil;

a master switch;

a primary side resistor, wherein the primary side coil, the master switch and the primary side resistor are connected in series between the DC positive terminal and the DC negative terminal of the rectifier;

a primary side capacitor;

an auxiliary switch connected in series with the primary side capacitor, wherein the auxiliary switch and the primary side capacitor are then connected in parallel with the primary side coil;

the primary side coil connected between the DC positive terminal of the rectifier and a node at which the master switch and the auxiliary switch are connected;

a primary side controller connected to a control terminal of the master switch and a control terminal of the auxiliary switch;

a secondary side switch;

a secondary side coil coupled with the primary side coil, wherein a loop circuit is formed by the secondary side coil, the secondary side switch and the load;

a secondary side controller connected to a control terminal of the secondary side switch;

a compensator connected to the secondary side coil and the primary side controller to generate a compensating signal output to the primary side controller.

In one embodiment, the primary side controller detects a state of the load, when the state of the load is the light-load state, a skipping mode is applied, and when the state of the load is not the light-load state, an ACF mode is applied; wherein the skipping mode is to decrease the switch frequency of the master switch and the auxiliary switch when the state of the load is getting light, and the ACF mode is to adjust the switch frequency of the master switch and the auxiliary switch to control the master switch to generate a reverse current when the state of the load is getting heavy.

In another embodiment, when a state of the load is getting heavy, the primary side controller changes the switch frequency of the master switch and the auxiliary switch and controls the master switch to generate a reverse current.

The present invention detects the state of the load and changes the switch frequency according to the state of the load. When the state of the load is not the light-load state, an ACF mode is applied to generate the master control signal and the auxiliary control signal. In the ACF mode, the switch frequency of the master switch and the auxiliary switch is decreased when the state of the load is getting heavy.

Oscillation in the primary side is maintained by decreasing the switch frequency. until the primary side magnetizing current of the active clamp converter is less than zero ampere to generate the reverse current. Furthermore the body diode of the master switch is turned on by the reverse current, the voltage across the master switch is decreased, and thus the switch loss can be reduced even the state of the load is getting heavy.

BRIEF DESCRIPTION OF THE DRAWINGS

FIG. 5A to FIG. 5C show control signals for a skipping mode of the active clamp converter in accordance with a first embodiment of the present invention.

FIG. 13(a) to FIG. 13(f) show different waveforms in a conventional active clamp converter.

DETAILED DESCRIPTION OF THE INVENTION

Figure 1:
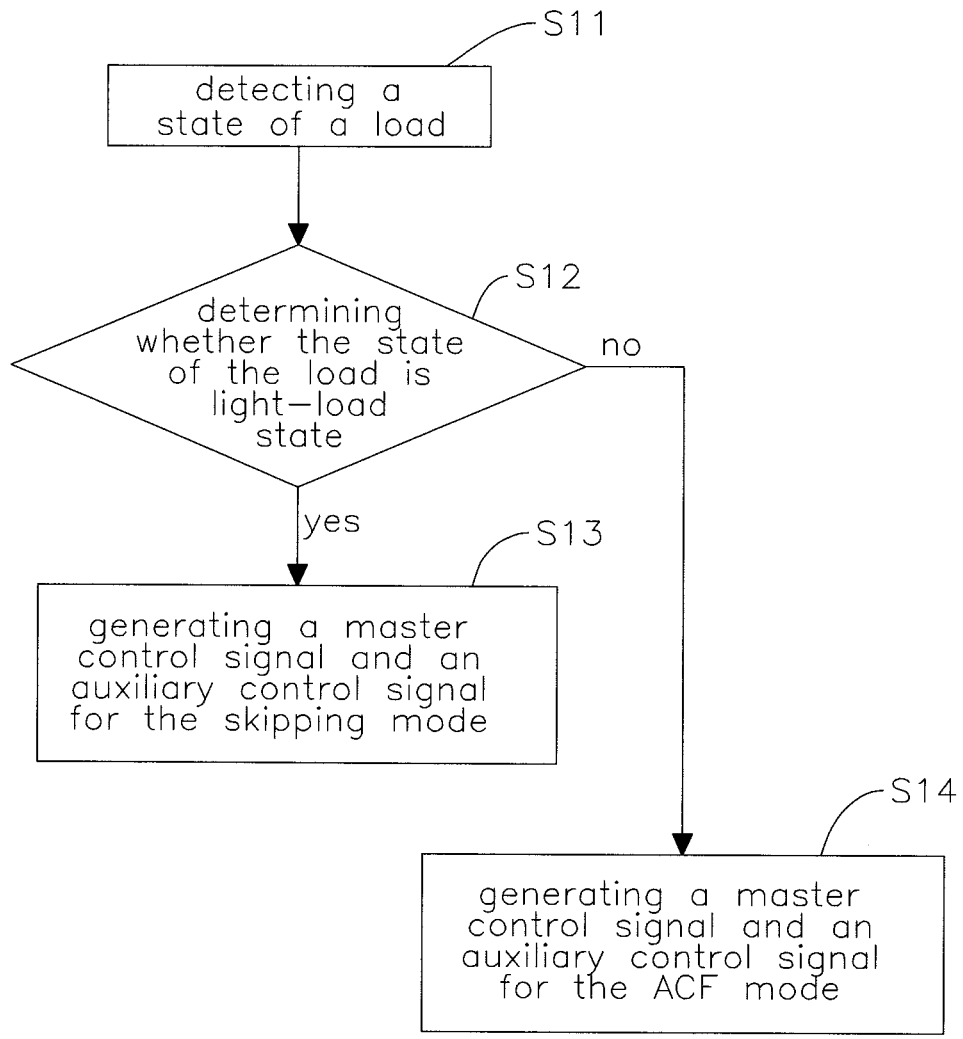
FIG. 1 is a flow chart of a control method for an active clamp converter of the present invention.

As shown in FIG. 1, the present invention provides an active clamp converter and a control method for the active clamp converter. The control method is applied to control a master switch and an auxiliary switch of a primary side of the active clamp converter, and includes the steps of:

detecting a state of a load (S11);

determining whether the state of the load is a light-load state or not;

when the state of the load is a light-load state, a skipping mode is applied to generate a master control signal and an auxiliary control signal (S13); wherein the master control signal controls the master switch to turn on/off and the auxiliary control signal controls the auxiliary switch to turn on/off; wherein the switch frequencies of the master switch and the auxiliary switch are decreased when the state of the load is getting light in the skipping mode;

when the state of the load is not the light-load state, an active clamp forward (ACF) mode is applied to generate the master control signal and the auxiliary control signal (S14); wherein in the ACF mode, the switch frequencies of the master switch and the auxiliary switch are increased for generating a reverse current when the state of the load is getting heavy so that the master switch is turned on by the reverse current.

The present invention detects the state of the load and adjusts the switch frequency based on the state of the load. When the state of the load is not the light-load state, the ACF mode is applied to generate the master control signal and the auxiliary control signal. In the ACF mode, when the state of the load is getting heavy, the switch frequencies of the master switch and the auxiliary switch will be modulated for generating the reverse current. By adjusting the switch frequency, the oscillating of an oscillating circuit is maintained until a magnetizing current of a primary side of the active clamp converter is less than zero ampere to generate the reverse current. The active clamp converter can generate the reverse current and a body diode of the master switch is conducted to reduce the voltage across the master switch. Therefore, the switching loss of the master switch will be reduced even when the state of the load is getting heavy.

Figure 2:
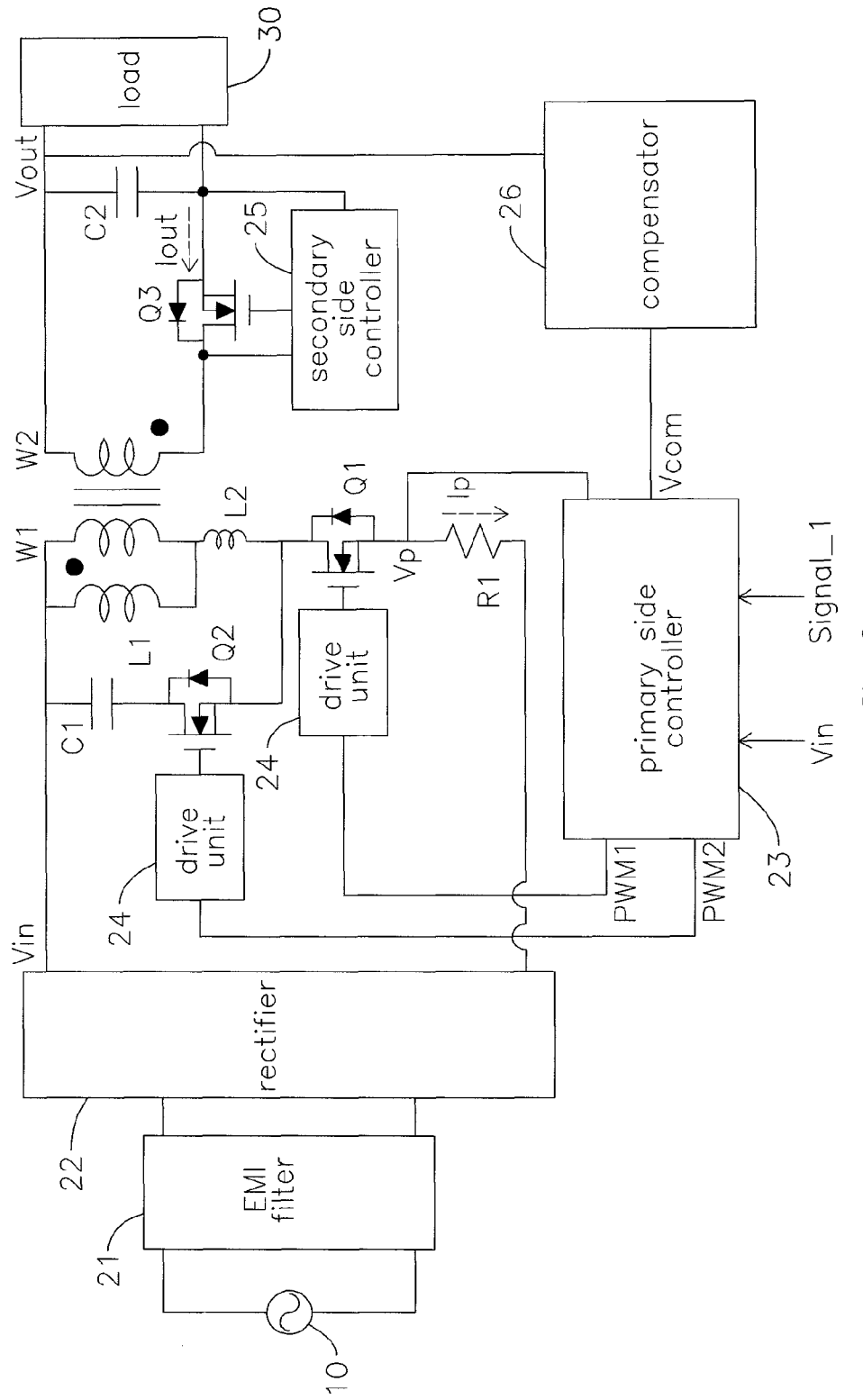
FIG. 2 is a circuit diagram of an active clamp converter of the present invention.

With reference to FIG. 2, the active clamp converter comprises a primary side and a secondary side. The primary side is coupled to an alternating current (AC) power supply 10 and composed of an electromagnetic interference filter 21, a rectifier 22, a master switch Q1, an auxiliary switch Q2, a magnetic inductor L1, a primary side leakage inductor L2, a primary side resistor R1, a primary side capacitor C1, a primary side coil W1, a primary side controller 23 and two drive units 24.

The electromagnetic interference filter 21 is electrically connected between the AC power supply 10 and the rectifier 22 to isolate electromagnetic interference from the AC power supply 10. The rectifier 22, having a DC positive terminal and a DC negative terminal, receives an alternating current power from the AC power supply 10 and rectifies the alternating current to a direct current power.

The magnetic inductor L1 is connected in parallel to the primary side coil W1, and first terminals of the magnetic inductor L1 and the primary side coil W1 are electrically connected to the DC positive terminal of the rectifier 22.

The auxiliary switch Q2 is connected in series between the primary side capacitor C1 and the master switch Q1. One terminal of the primary side capacitor C1 is connected to the DC positive terminal of the rectifier 22. One terminal of the master switch Q1 is connected to the DC negative terminal of the rectifier 22 through the primary side resistor R1.

One terminal of the primary side leakage inductor L2 is electrically connected to the magnetic inductor L1. The other terminal of the primary side leakage inductor L2 is electrically connected to a node at which the master switch Q1 and the auxiliary switch Q2 are connected.

The primary side controller 23 is electrically connected to the two drive units 24 and a node at which the master switch Q1 and the primary resistor R1 are connected. The primary side controller 23 is connected to a control terminal of the master switch Q1 and a control terminal of the auxiliary switch Q2 via the two drive units 24.

The secondary side is electrically coupled to a load 30 and composed of a secondary side coil W2, a secondary side switch Q3, a secondary side output capacitor C2, a secondary side controller 25 and a compensator 26. A first terminal of the secondary side coil W2 is connected to a first terminal of the secondary side output capacitor C2, while a second terminal of the secondary side coil W2 is connected to a second terminal of the secondary side output capacitor C2 through the secondary side switch Q3.

The secondary side controller 25 is connected to the control terminal of the secondary side switch Q3, a node at which the secondary side output capacitor C2 and the secondary side switch Q3 are connected, and a node at which the secondary side switch Q3 and the secondary side coil W2 are connected. The secondary side controller 25 generates a control signal according to the signals of the two terminals of the secondary side switch Q3, and outputs the control signal to the control terminal of the secondary side switch Q3 to turn on and off the secondary side switch Q3.

The compensator 26 is connected to a node at which the secondary side coil W2 and the secondary side output capacitor C2 are connected, i.e. the output terminal of the active clamp converter. The compensator 26 is electrically connected to the primary side controller 23 and generates a compensating signal Vcom according to the output voltage Vout of the active clamp converter. The compensator 26 outputs the compensating signal Vcom to the primary side controller 23.

The primary side controller 23 generates a master control signal PWM1 and an auxiliary control signal PWM2 according to an input voltage Vin, a first signal Signal_1, a feedback signal of the current of the master switch Q1 and the compensating signal Vcom. The input voltage Vin is the voltage at the node at which the primary side capacitor C1 and the primary side coil W1 are connected together. The feedback signal of the current of the master switch Q1 is a voltage of at a node Vp at which the primary side resistor R1 and the master switch Q1 are connected together. The master control signal PWM1 and the auxiliary control signal PWM2 are transmitted to the master switch Q1 and the auxiliary switch Q2 via the two drive units 24 respectively to control the master switch Q1 and the auxiliary switch Q2. The master control signal PWM1 controls the master switch Q1 to be turned on and off, while the auxiliary control signal PWM2 controls the auxiliary switch Q2 to be turned on and off.

In this preferred embodiment, the master switch Q1, the auxiliary switch Q2 and the secondary side switch Q3 are MOSFETs.

Figure 3:
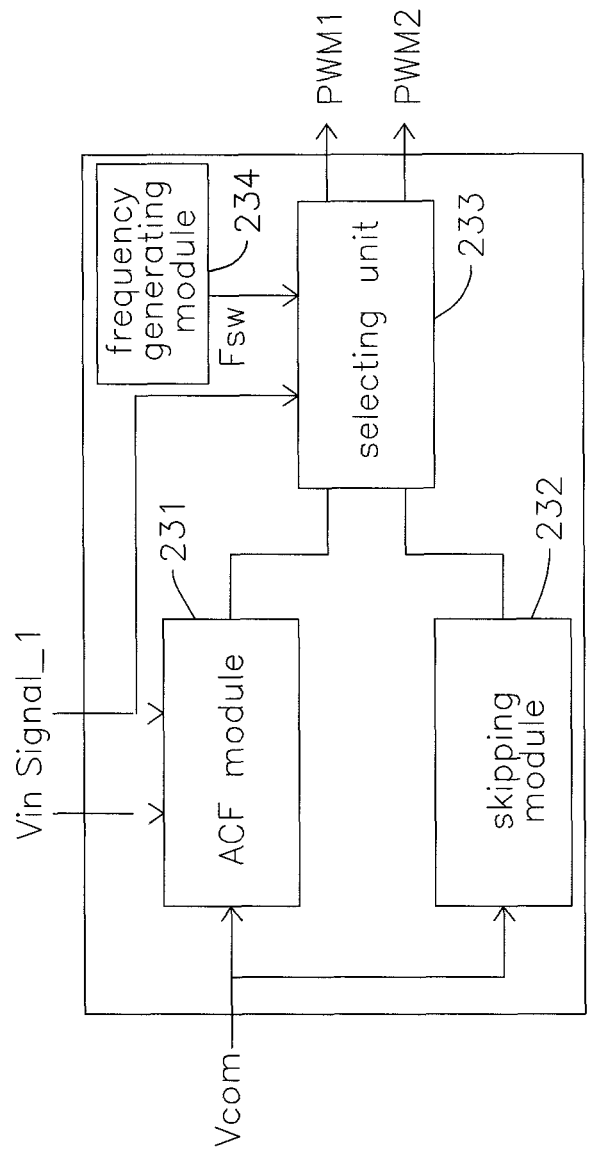
FIG. 3 is a block diagram of a primary side controller of the active clamp converter of the present invention.

As shown in FIG. 3, the primary side controller 23 includes an ACF module 231, a skipping module 232, a selecting unit 233 and a frequency generating module 234.

The frequency generating module 234 generates a switch frequency Fsw of the master switch Q1 and is electrically connected to the ACF module 231, the skipping module 232 and the selecting unit 233.

The ACF module 231 receives the switch frequency Fsw, the compensating signal Vcom, the input voltage Vin and the first signal Signal_1 and accordingly generates the master control signal PWM1 and the auxiliary control signal PWM2 for the ACF mode. In one embodiment, the first signal Signal_1 may be a current signal generated by detecting an output current Iout flowing through the secondary side switch Q3. Generally, the current value of the current signal can be calculated based on a voltage value, wherein the voltage value is generated through a current transformer detecting the output current Iout. In other embodiments, the first signal Signal_1 may be the voltage Vp at the node at which the primary side resistor R1 and the master switch Q1 are connected together, and the current value of the output current Iout may be calculated based on the voltage Vp.

The skipping module 232 receives the switch frequency Fsw and the compensating signal Vcom and generates the master control signal PWM1 and the auxiliary control signal PWM2 for the skipping mode.

The selecting unit 233 receives the first signal Signal_1 and the switch frequency Fsw to detect whether the state of the load 30 is the light-load state or not. When the state of the load is the light-load state, the selecting unit 233 selects and outputs the master control signal PWM1 and the auxiliary control signal PWM2 generated by the skipping module 232. When the state of the load is not the light-load state, the selecting unit 233 selects and outputs the master control signal PWM1 and the auxiliary control signal PWM2 generated by the ACF module 231. In this preferred embodiment, both of the master control signal PWM1 and the auxiliary control signal PWM2 are pulse-width modulation signals. When the master control signal PWM1 and the auxiliary control signal PWM2 are at a high level, the master switch Q1 and auxiliary switch Q2 are turned on. When the master control signal PWM1 and the auxiliary control signal PWM2 are at a low level, the master switch Q1 and the auxiliary switch Q2 are turned off.

Figure 4:
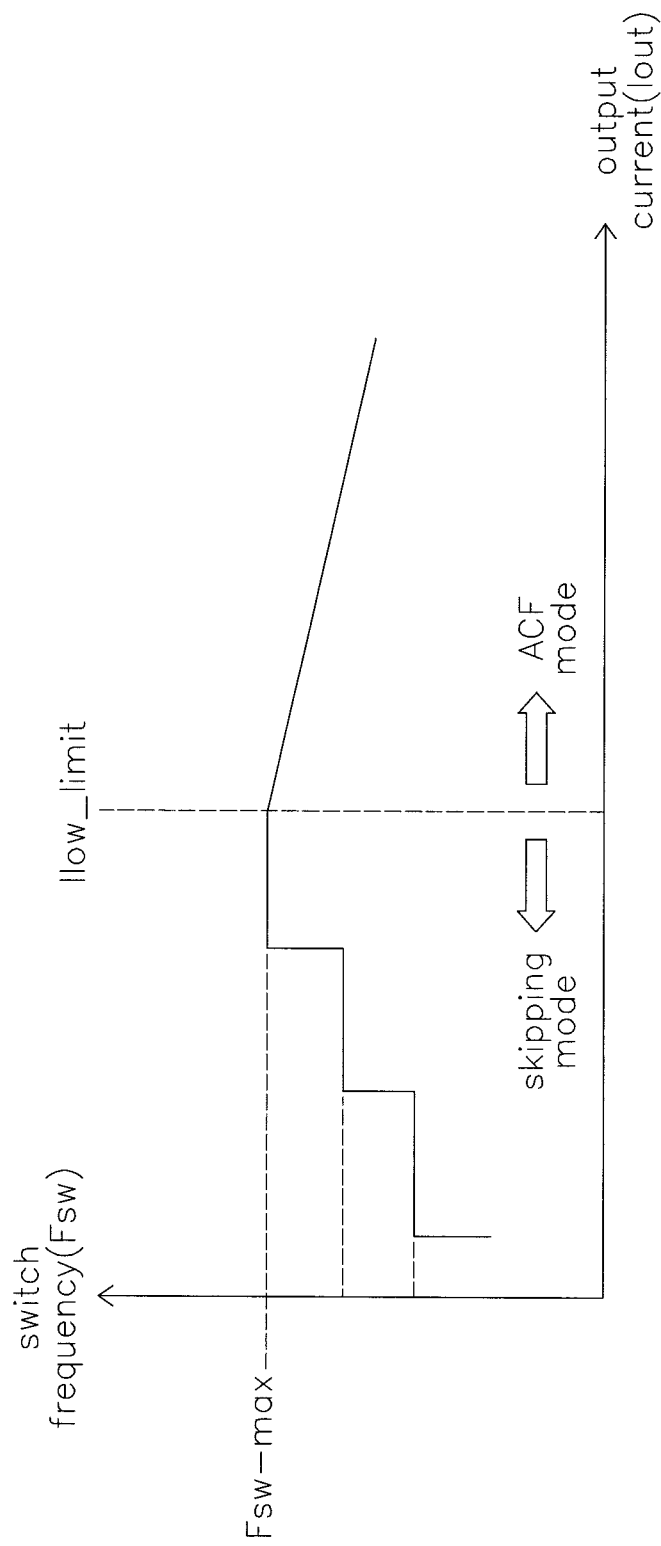
FIG. 4 shows an output current of the active clamp converter of the present invention.

With reference to FIG. 4, in this preferred embodiment, the state of the load 30 has a positive correlation with the output current Iout, and the selecting unit 233 determines the state of the load 30 based on the output current Iout and the switch frequency Fsw. When the output current Iout is less than a threshold value $I_{low\_limit}$ and the switch frequency Fsw equals a frequency threshold Fsw_max, the state of the load 30 is identified as the light-load state, otherwise the state of the load 30 is identified as not the light-load state.

As shown in FIG. 4, when the output current Iout is less than the threshold value $I_{low\_limit}$ and the switch frequency Fsw equals a frequency threshold Fsw_max, the selecting unit 233 selects and outputs the master control signal PWM1 and the auxiliary control signal PWM2 generated by the skipping module 232. As the state of the load 30 is getting light, the switch frequency Fsw is decreased. In other words, after the output current Iout is less than the threshold value $I_{low\_limit}$, the switch frequency Fsw will decrease with the output current Iout.

When the load 30 is getting into the light-load state, it means the load 30 will get into a standby mode. If the switch frequency Fsw is too high when the load 30 enters the standby mode, the frequently switching of the master switch Q1 and the auxiliary switch Q2 will cause more switching loss. Thus, the present invention further decreases the switch frequency Fsw when the load 30 is at the light-load state to reduce the switching loss, which is an energy efficiency power saving function.

Otherwise, when the output current Iout is not less than the threshold value Ilow_limit and the switch frequency Fsw equals the frequency threshold Fsw_max, the selecting unit 233 selects and outputs the master control signal PWM1 and the auxiliary control signal PWM2 generated by the ACF module 231. Meanwhile, as the load 30 is getting heavy, the switch frequency Fsw will decrease. That means when the output current Iout is not less than the threshold value $I_{low\_limit}$, the switch frequency Fsw will change with the output current Iout.

With reference to FIG. 5A to 5C, a first embodiment of the master control signal PWM1 and the auxiliary control signal PWM2 for the skipping mode is shown. In the first embodiment, when the state of the load 30 is less than a first threshold value, the master control signal PWM1 and the auxiliary control signal PWM2 only remain in the first cycle of N1 consecutive cycles, but in the rest N1−1 cycles the pulse-width modulation signals are offset by a shield signal. When the state of the load 30 is further less than a second threshold value, the master control signal PWM1 and the auxiliary control signal PWM2 only remain in the first cycle of N2 consecutive cycles, in the rest N2−1 cycles the pulse-width modulation signals are offset by a shield signal, wherein N1<N2 and the first threshold value is greater than the second threshold value.

For instance, N1=2 while N2=4. With reference to FIG. 5A, the master control signal PWM1 and the auxiliary control signal PWM2 are complementary to each other. However, when the state of the load 30 is getting light, with reference to FIG. 5B, the state of the load 30 is less than the first threshold value, the master control signal PWM1 and the auxiliary control signal PWM2 only remain in the first cycle of each two consecutive cycles but are offset by the shield signal in the rest cycle of the each two consecutive cycles. For example, the cycles of the master control signal PWM1 and the auxiliary control signal PWM2 are T in FIG. 5A, but in FIG. 5B, the master control signal PWM1 and the auxiliary control signal PWM2 only remain during the first cycle of two consecutive cycles, and thereby the cycles of the master control signal PWM1 and the auxiliary control signal PWM2 are changed to 2T in FIG. 5B. That means the frequency of the master control signal PWM1 and the auxiliary control signal PWM2 in FIG. 5B reduce as half of the frequency in FIG. 5A. Thus, the switch frequency Fsw of the master switch Q1 and the switch frequency of the auxiliary switch Q2 are decreased.

When the state of the load 30 is further less than the second threshold value, the master control signal PWM1 and the auxiliary control signal PWM2 only remain in the first cycle of each four consecutive cycles and are offset by a shield signal in the rest three cycles of the each four consecutive cycles. For example, the cycles of the master control signal PWM1 and the auxiliary control signal PWM2 are T in FIG. 5A. In FIG. 5C, the master control signal PWM1 and the auxiliary control signal PWM2 only remain in the first cycle of four consecutive cycles, and thereby the cycles of the master control signal PWM1 and the auxiliary control signal PWM2 are changed to 4T in FIG. 5B. That means the frequency of the master control signal PWM1 and the auxiliary control signal PWM2 in FIG. 5B reduce as a quarter of the frequency in FIG. 5A. Thus the switch frequency Fsw of the master switch Q1 and the switch frequency of the auxiliary switch Q2 are decreased.

Therefore, as shown in FIG. 4, in the first embodiment of the skipping mode, the switch frequency Fsw of the master control signal PWM1 and the switch frequency of the auxiliary control signal PWM2 are stepped down with the decrease of the load 30.

Figure 6A:
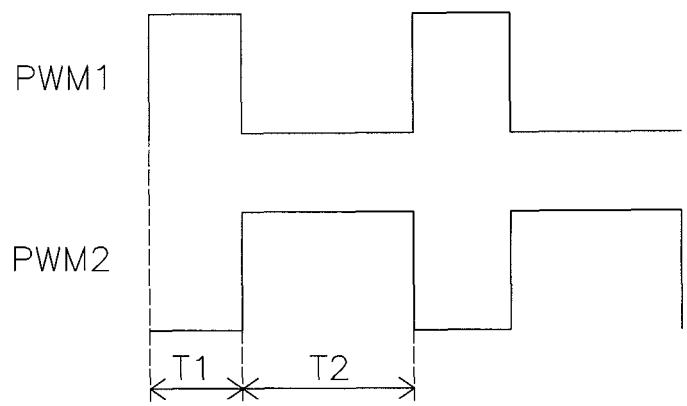
FIG. 6A to FIG. 6 C show different control signals for the skipping mode of the active clamp converter in accordance with a second embodiment of the present invention.
Figure 6B:
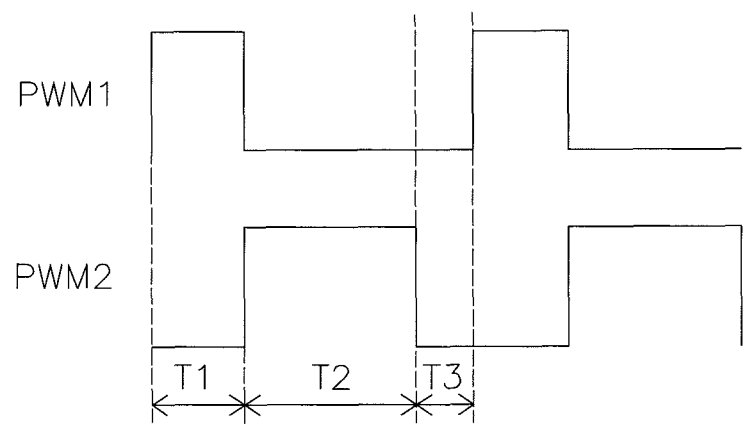
Figure 6C:
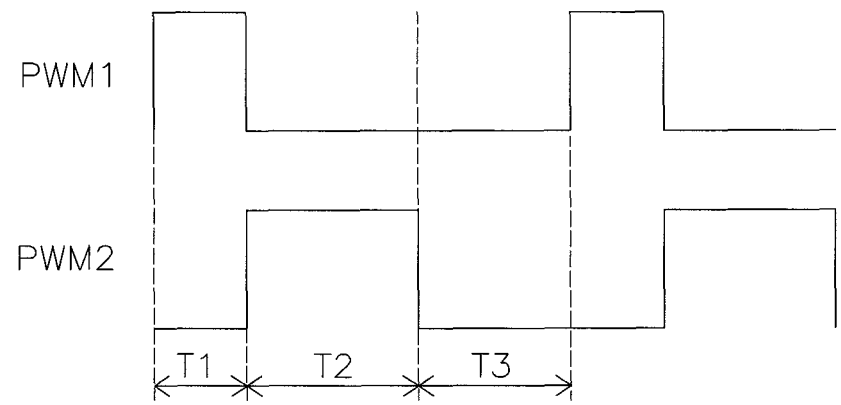

With reference to FIG. 6A to 6C, a second embodiment of the master control signal PWM1 and the auxiliary control signal PWM2 for the skipping mode is shown. In the second preferred embodiment, as shown in FIG. 6A, the master control signal PWM1 and the auxiliary control signal PWM2 are complementary to each other. The pulse-width of the master control signal PWM1 is T1, the pulse-width of the master control signal PWM2 is T2, and the cycle of the master control signal PWM1 and the auxiliary control signal PWM2 is T1+T2. With the decrease of the state of the load 30, as shown in FIG. 6B, the master control signal PWM1 and the auxiliary control signal PWM2 further have a turn-off delay time T3 in each cycle. The turn-off delay time T3 is inversely proportional to the state of the load 30. During the turn-off delay time T3, both the master switch Q1 and the auxiliary switch Q2 are turned off. For example, the original cycle of the master control signal PWM1 and the auxiliary control signal PWM2 is T1+T2 in FIG. 6A, but the master control signal PWM1 and the auxiliary control signal PWM2 further have the turn-off delay time T3 in FIG. 6B. Thus the cycle of the master control signal PWM1 and the auxiliary control signal PWM2 in FIG. 6B is changed to T1+T2+T3.

As shown in FIG. 6C, as the state of the load 30 is getting light, the turn-off time T3 is further increased because the turn-off delay time T3 is inversely proportional to the state of the load 30. Thereby, the cycle of the master control signal PWM1 and the auxiliary control signal PWM2 is increased to T1+T2+T3. The switch frequency Fsw of the master control signal PWM1 and the switch frequency of the auxiliary control signal PWM2 decrease with decreasing of the state of the load 30.

In the first embodiment of the ACF mode, the master control signal PWM1 and the auxiliary control signal PWM2 are complementary to each other and a comparison table of parameters is established. The parameters in the comparison table may comprise voltage parameters Kv and current parameters Ki. The voltage parameters Kv and the current parameters Ki are correlated to the input voltage Vin and output current Iout. The switch frequency Fsw may be determined by the following equation:

$$Fsw = Kv \times Vin + Ki \times Iout$$

The switch frequency Fsw is proportional to the input voltage Vin, but is inversely proportional to the output current Iout. Ki is a negative value.

Figures 7A, 7B:
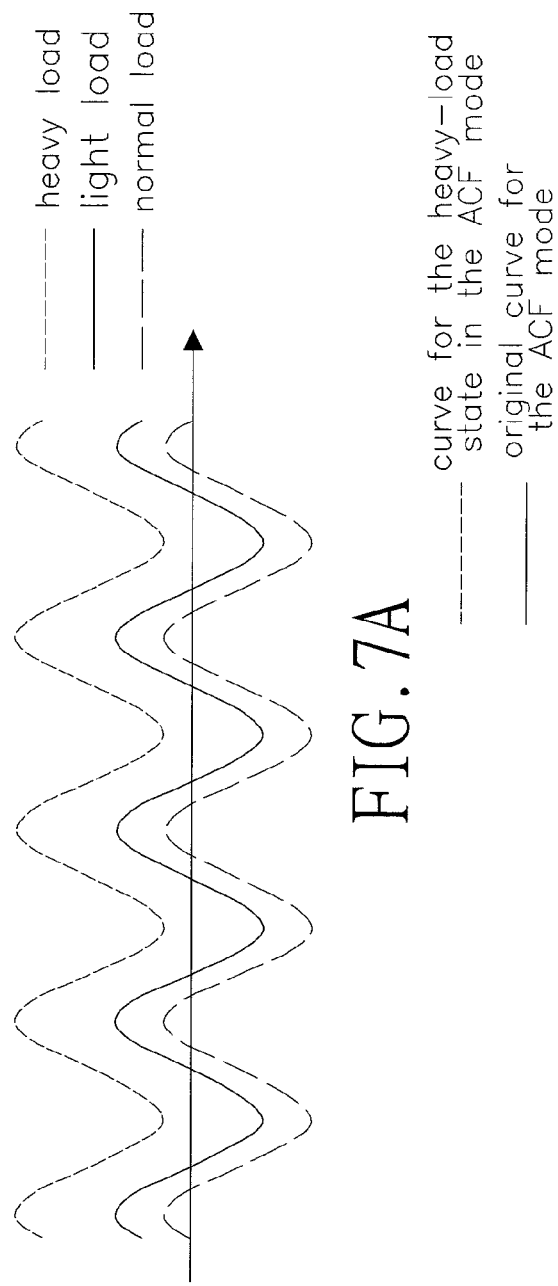
FIG. 7A and FIG. 7B show current waveforms of a magnetic inductor corresponding to different states of the load of the present invention.

With reference to FIG. 7A to FIG. 7B, the current level of the primary side magnetizing current of the active clamp converter changes with the state of the load 30 wherein the primary side magnetizing current is the current flowing through the magnetic inductor L1.

With reference to FIG. 7A for conventional circuit operation, when the state of the load 30 is the heavy-load state, the current level of the primary side magnetizing current will be pulled up. Otherwise when the state of the load 30 is the light-load state, the current level of the primary side magnetizing current will be pulled down. Thus, when the state of the load 30 is the heavy-load state and greater than the first threshold value, no matter how the primary side magnetizing current oscillates, the reverse current will not occur.

Contrary to FIG. 7A, the switch frequency Fsw of the master switch Q1 and the switch frequency of the auxiliary switch Q2 are decreased when the state of the load 30 is getting heavy. With reference to FIG. 7B, the decreased switch frequency Fsw of the master switch Q1, as shown by the broken lines, makes the primary side oscillating circuit maintain its oscillating until the primary side magnetizing current is less than zero ampere to generate the reverse current. Although the current level of the primary side magnetizing current will be increased with the state of the load 30, the switch frequency Fsw of the master switch Q1 still can be decreased to generate the reverse current in accordance with the present invention. Accordingly, the voltage across the master switch Q1 is also decreased to reduce the switching loss.

Therefore, in the first embodiment of the ACF mode, when the state of the load 30 is getting heavy, i.e. the output current Iout is increased, the switch frequency Fsw will be decreased.

Figure 8:
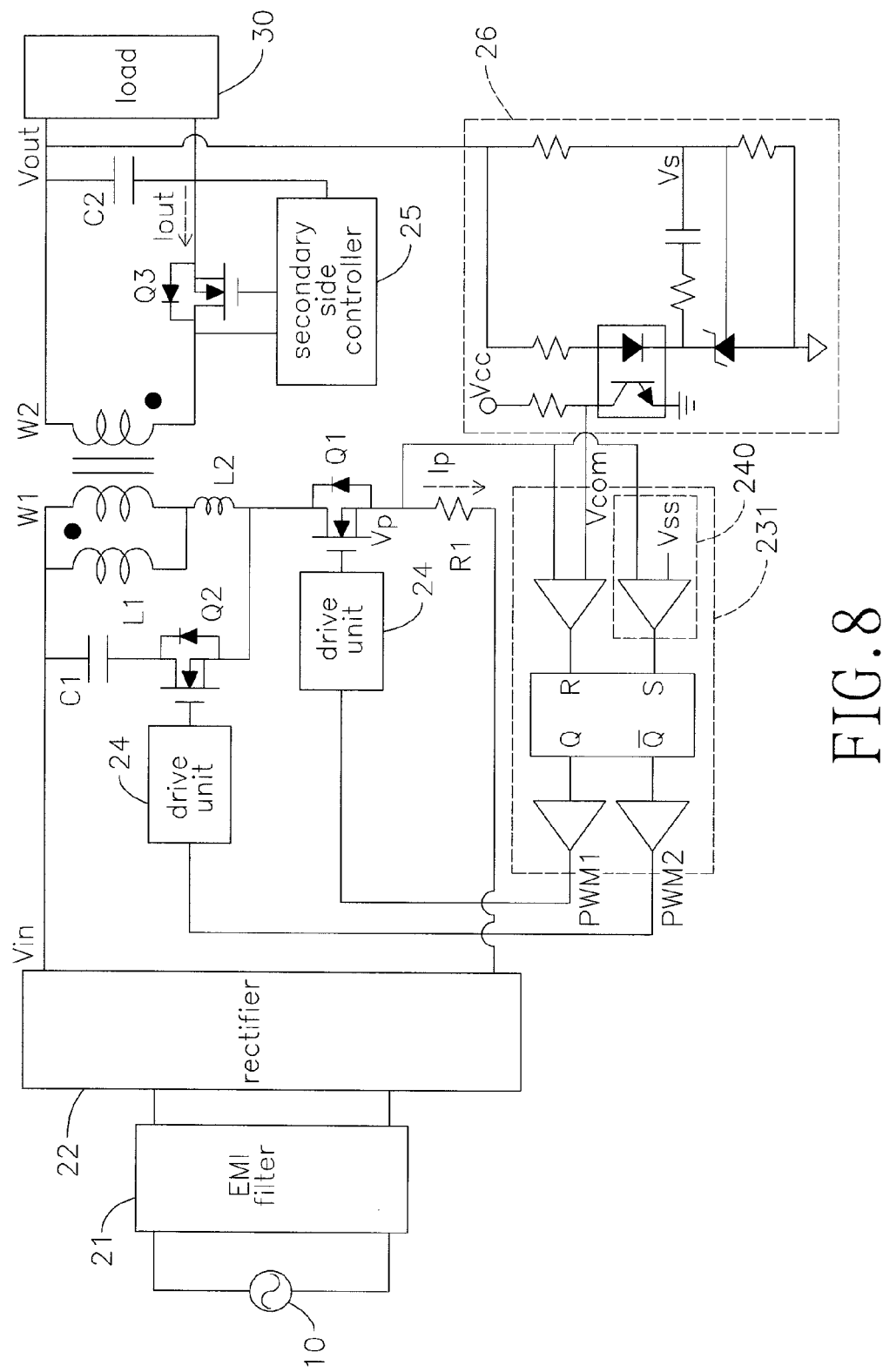
FIG. 8 and FIG. 9 are circuit diagrams of the second embodiment in an ACF mode of the active clamp converter of the present invention.

As shown in FIG. 8, in the second embodiment, the master control signal PWM1 and the auxiliary control signal PWM2 are complementary to each other. The ACF module 231 samples the current Ip flowing through the master switch Q1 via a reverse current detector 240. When the sampled current is greater than zero ampere, the switch frequency Fsw of the master switch Q1 in the next cycle will be decreased. When the sample current is less than zero ampere, the switch frequency Fsw of the master switch Q1 in the next cycle will be increased. When the sample is equal to zero ampere, the switch frequency Fsw of the master switch Q1 in the next cycle will be held. The reverse current detector 240 has a comparator having two input terminals respectively connected to the master switch Q1 and a negative power supply Vss to detect whether the sampled current is less than zero. In this preferred embodiment, the voltage value of the negative power supply Vss is a negative voltage, for example −0.2 volt.

Figure 9:
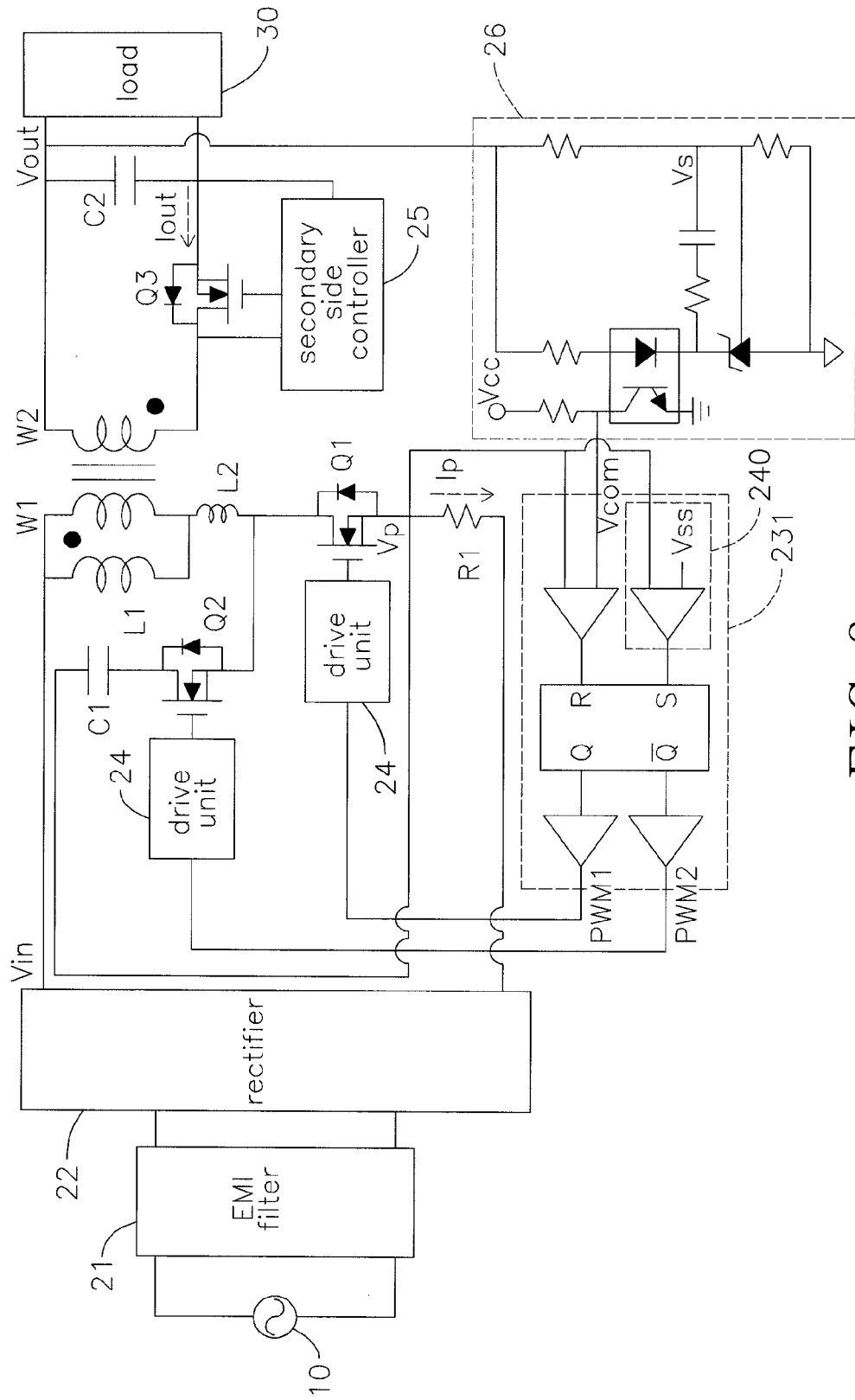

Furthermore, with reference to FIG. 9, in this preferred embodiment, one terminal of the primary side capacitor C1 is electrically connected to the node at which the master switch Q1 and the primary side resistor R1 are connected together. Thus the current flowing through the master switch Q1 and the auxiliary switch Q2 can be detected by the primary resistor R1 for better controlling.

In short, in the second embodiment of the master control signal PWM1 and the auxiliary control signal PWM2, the switch frequency Fsw of the master switch Q1 in next cycle is adjusted according to the current flowing through the master switch Q1. The master switch Q1 may generate the reverse current by the change of the switch frequency. When the master switch Q1 generates the reverse current, the master switch Q1 is turned on to reduce the switching loss.

Figure 10:
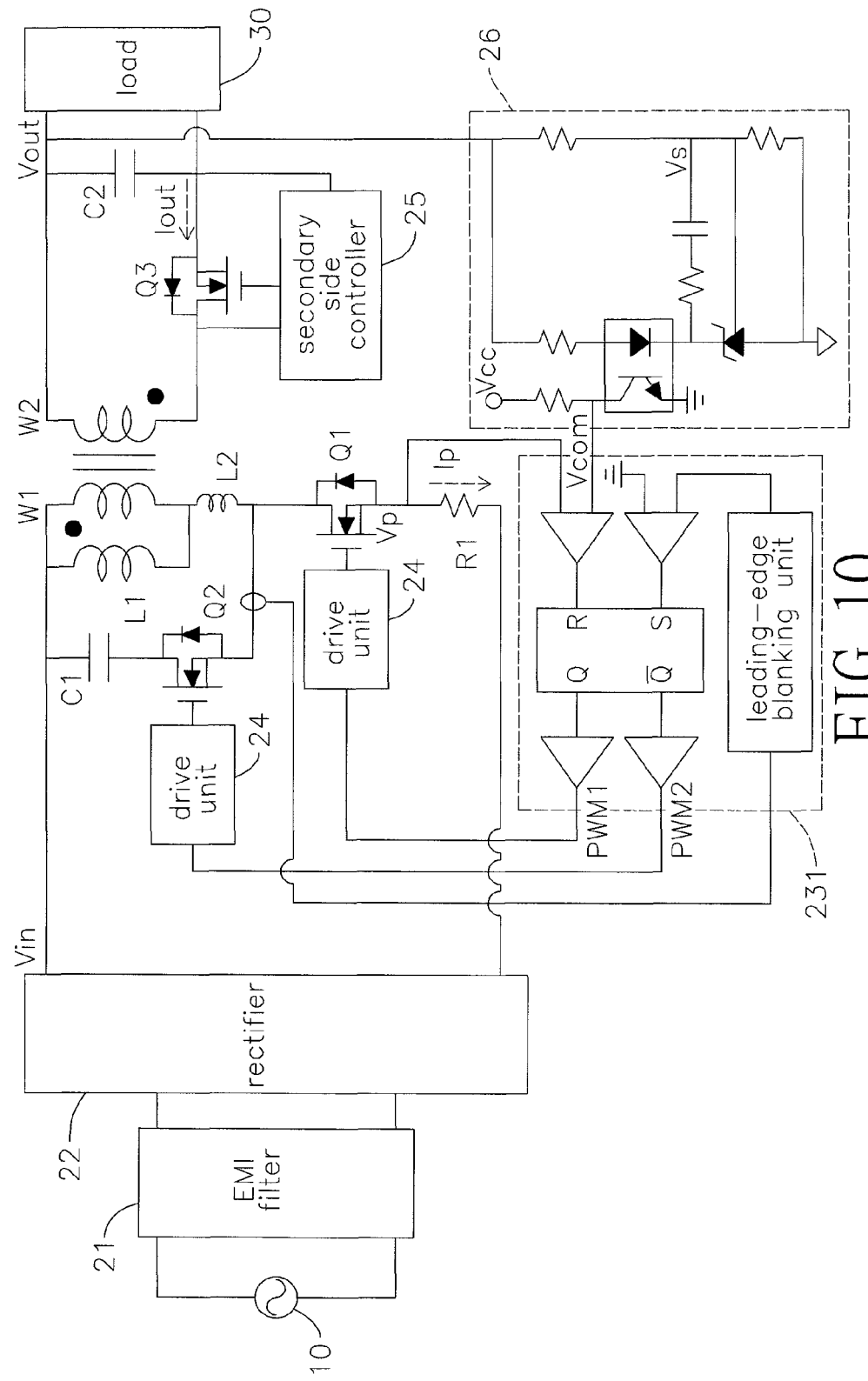
FIG. 10 to FIG. 12 are circuit diagrams of a third embodiment in an ACF mode of the active clamp converter of the present invention.
Figure 11:
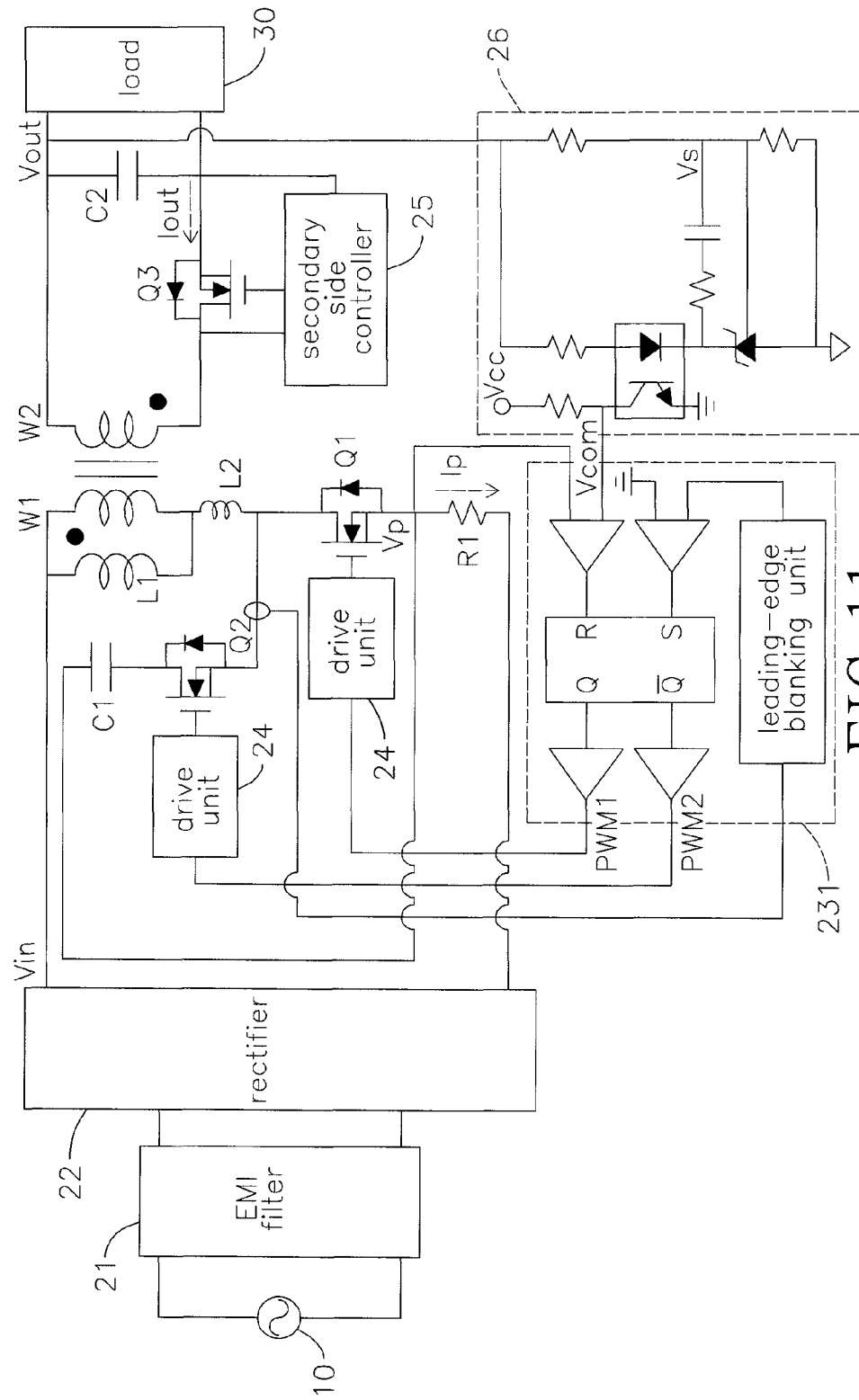
Figure 12:
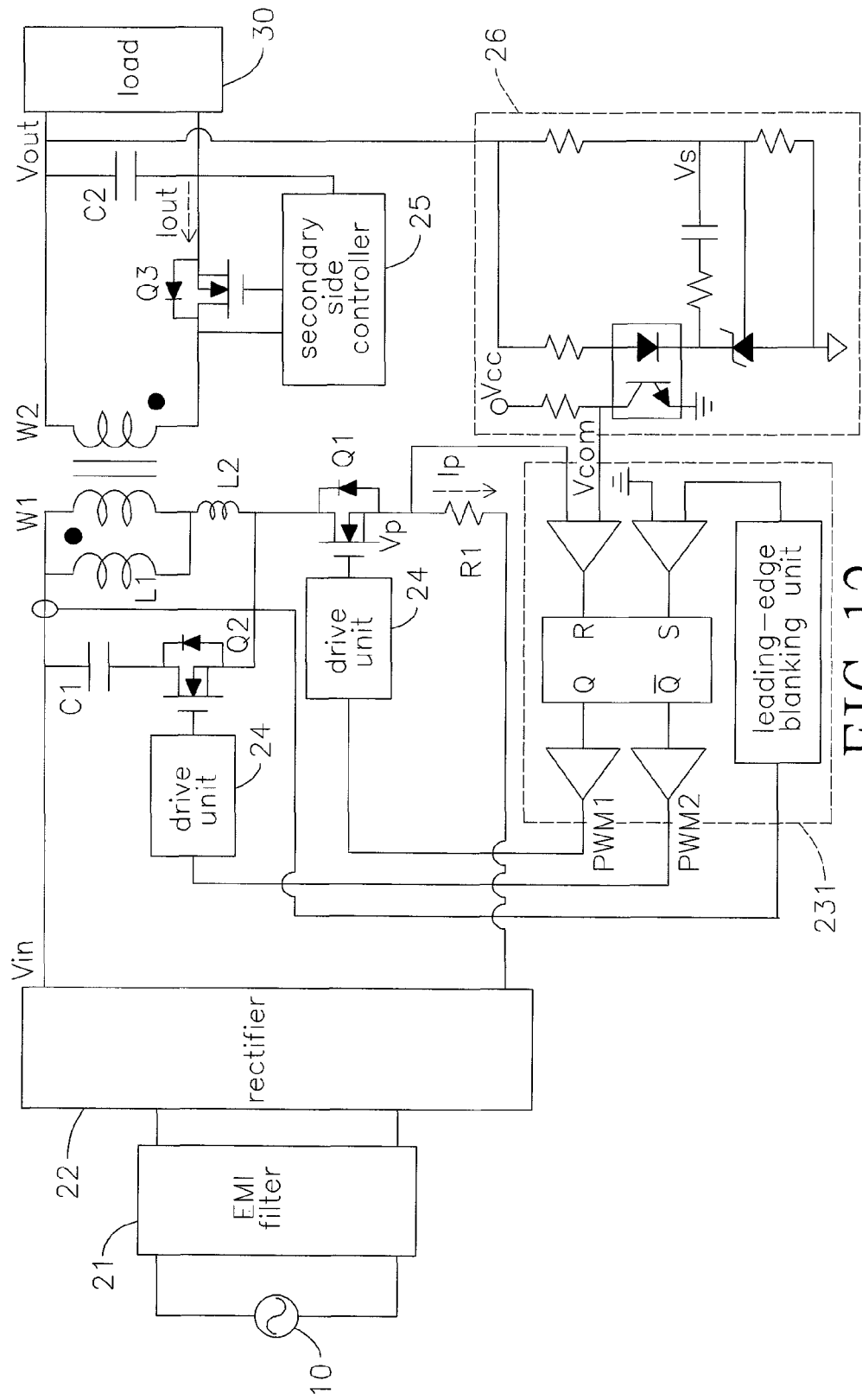
Figure 13A:
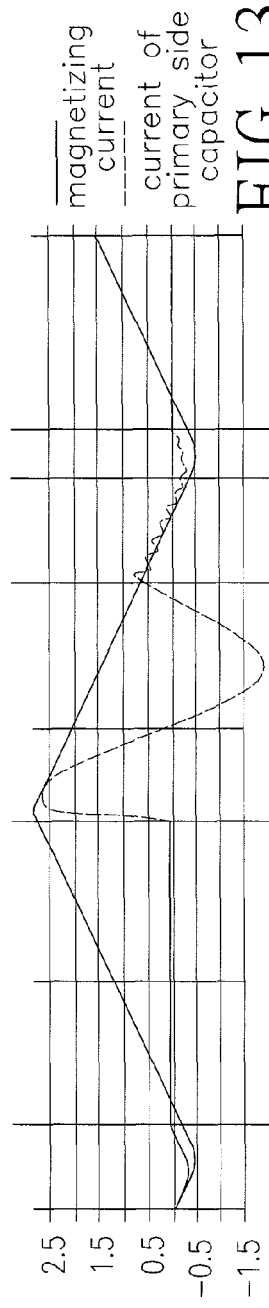
Figure 13B:
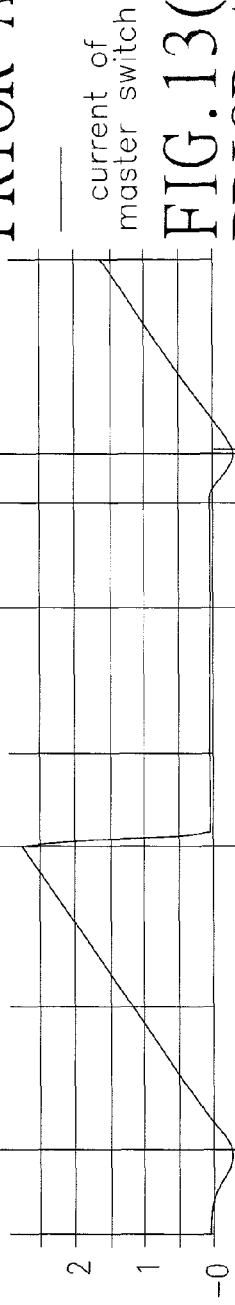
Figure 13C:
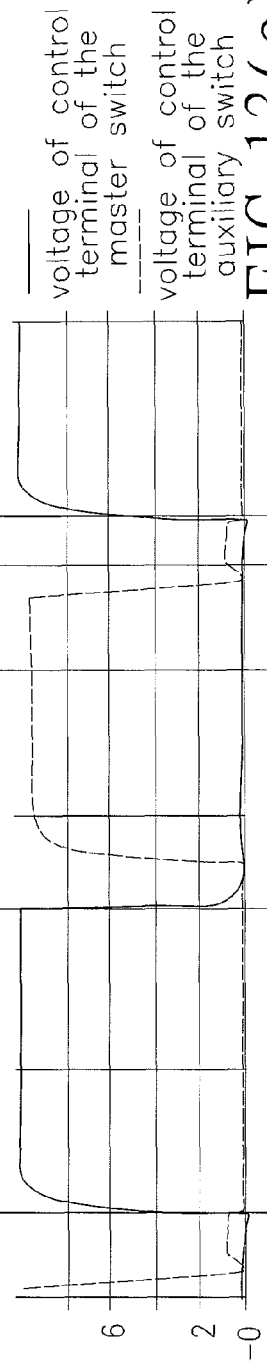
Figure 14:
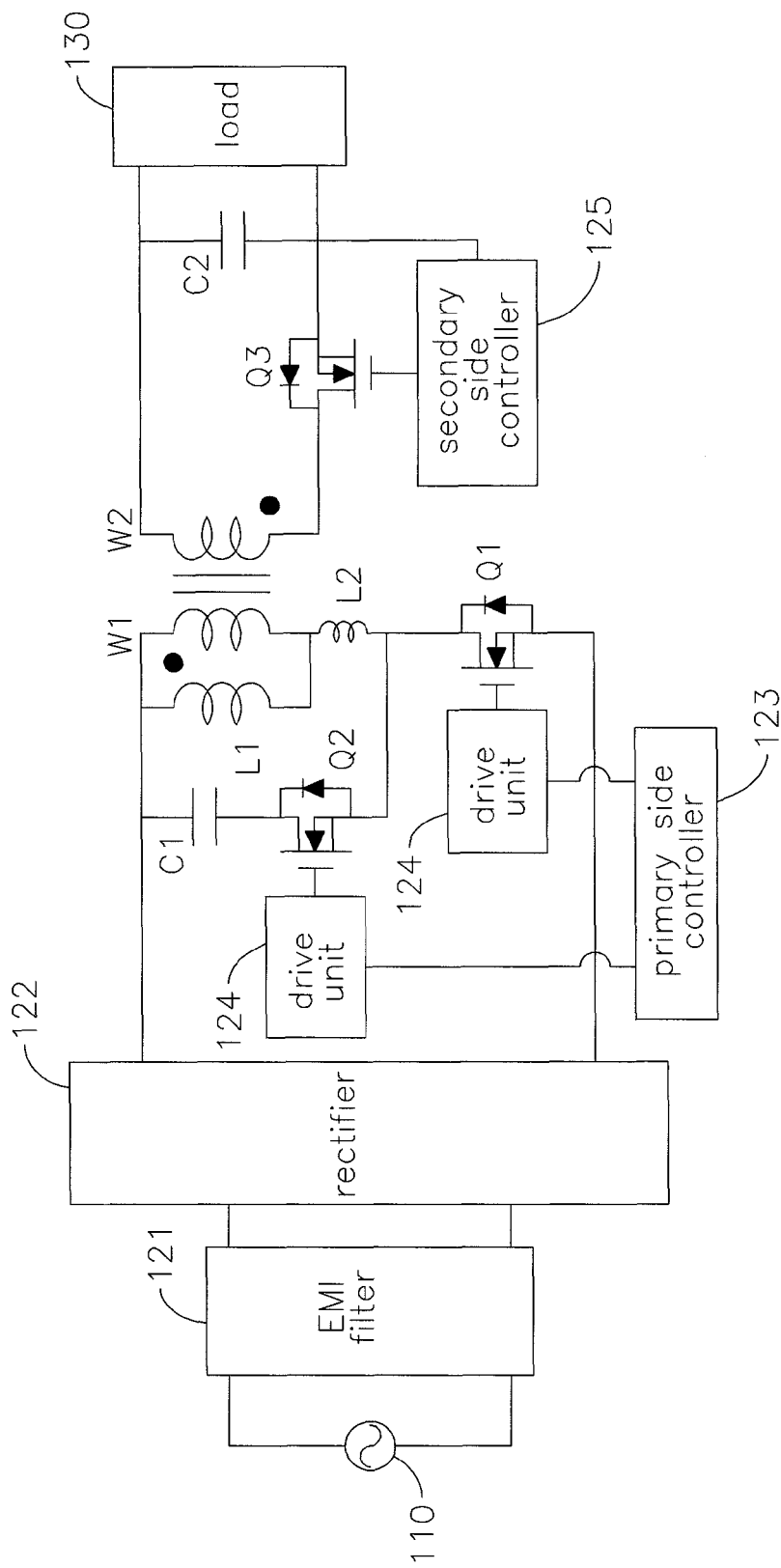
FIG. 14 is a circuit diagram of the conventional active clamp converter.
Figure 15:
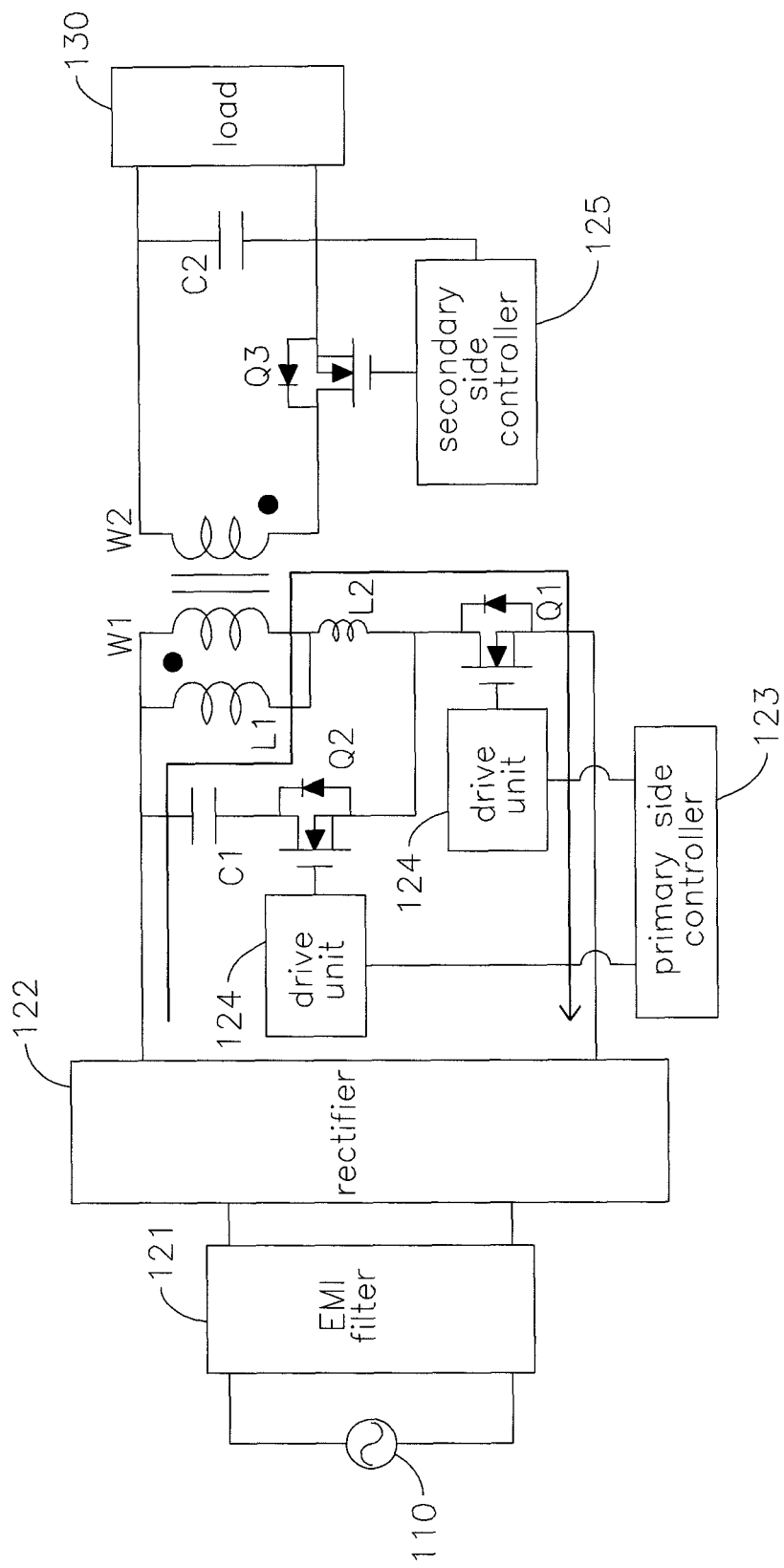
FIG. 15 is a current flow diagram during the time interval t0 to t1 of the conventional active clamp converter.
Figure 16:
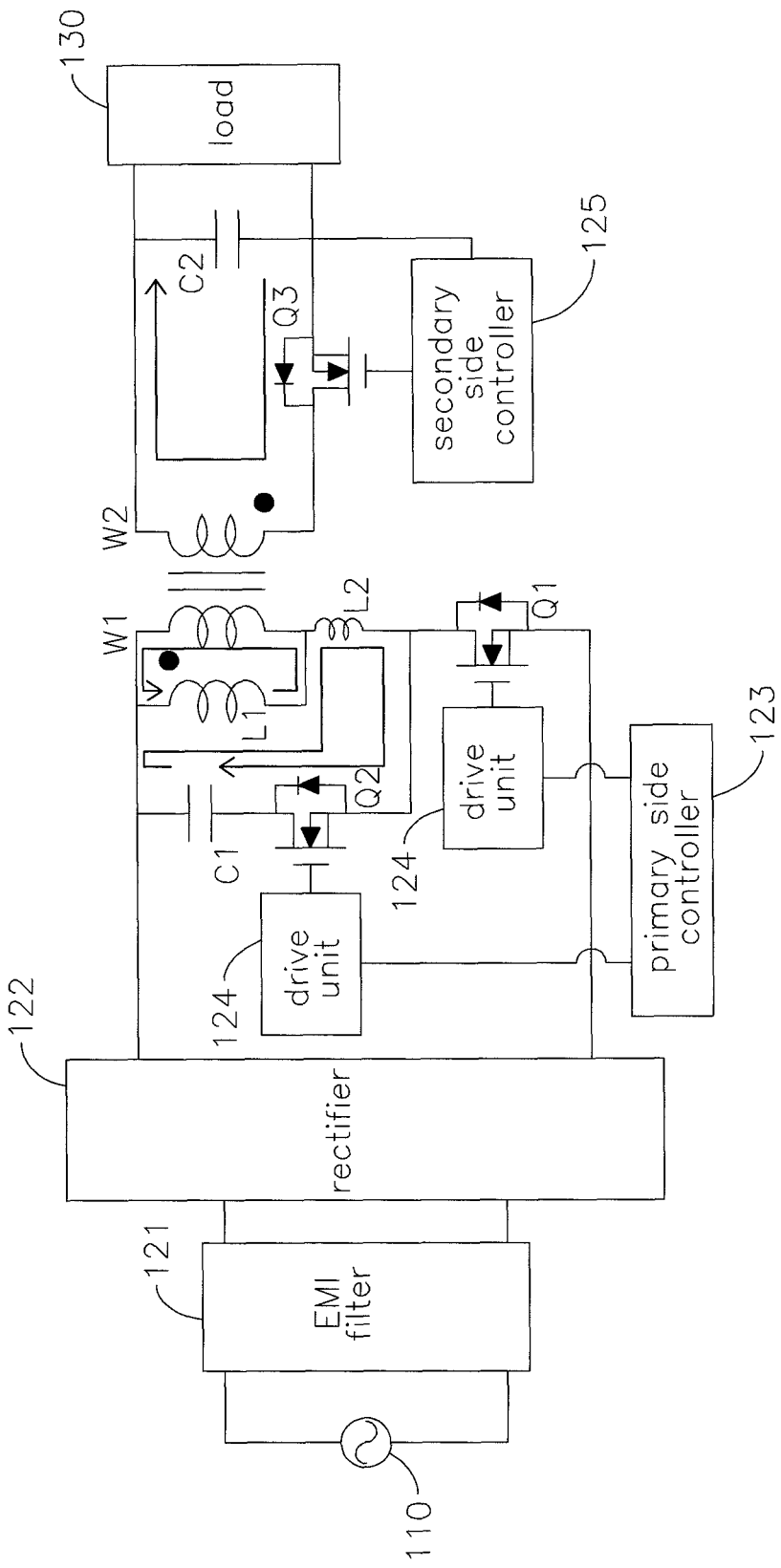
FIG. 16 and FIG. 17 are current flow diagrams during the time interval t1 to t2 of the conventional active clamp converter.
Figure 17:
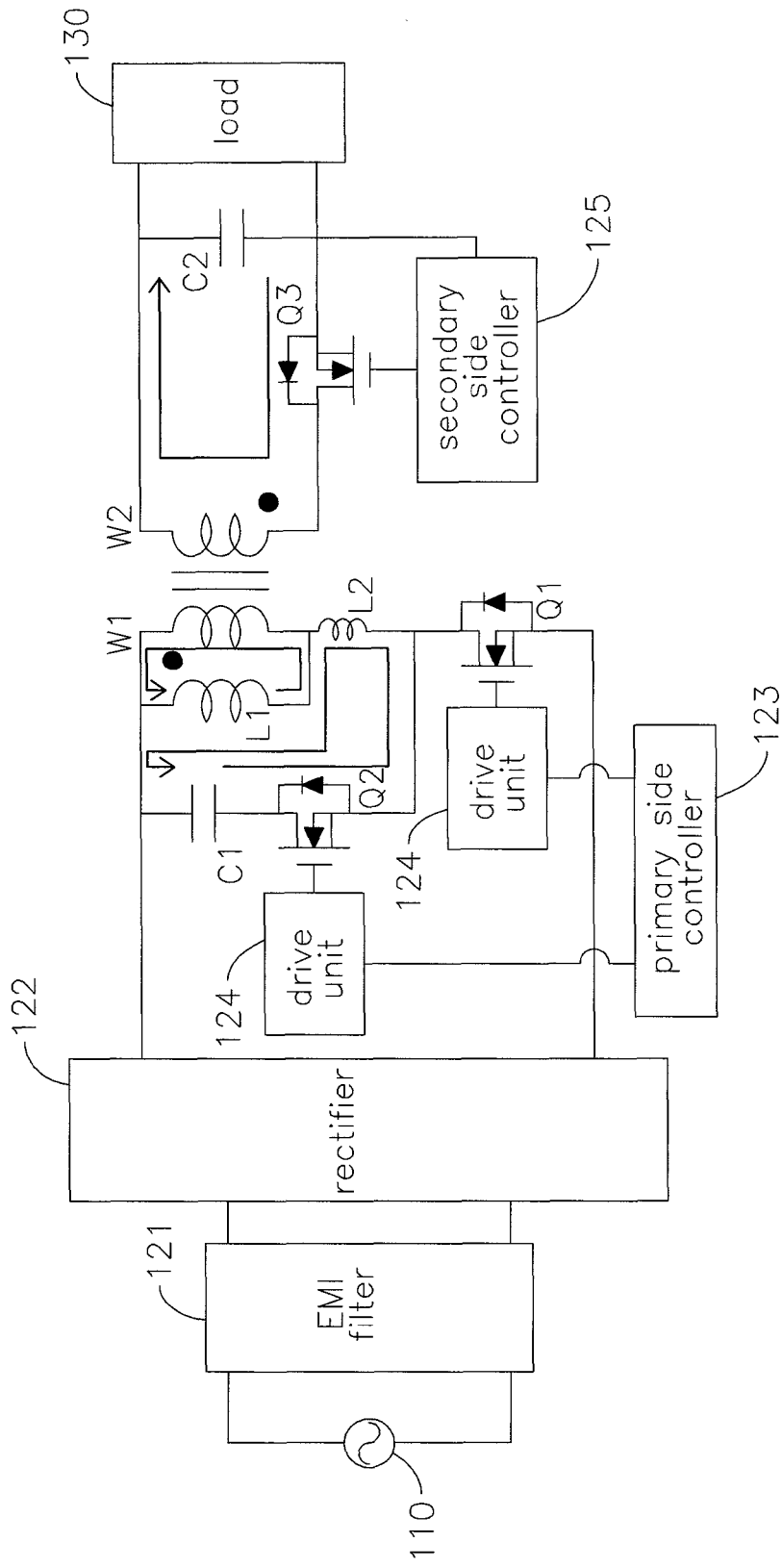
Figure 18:
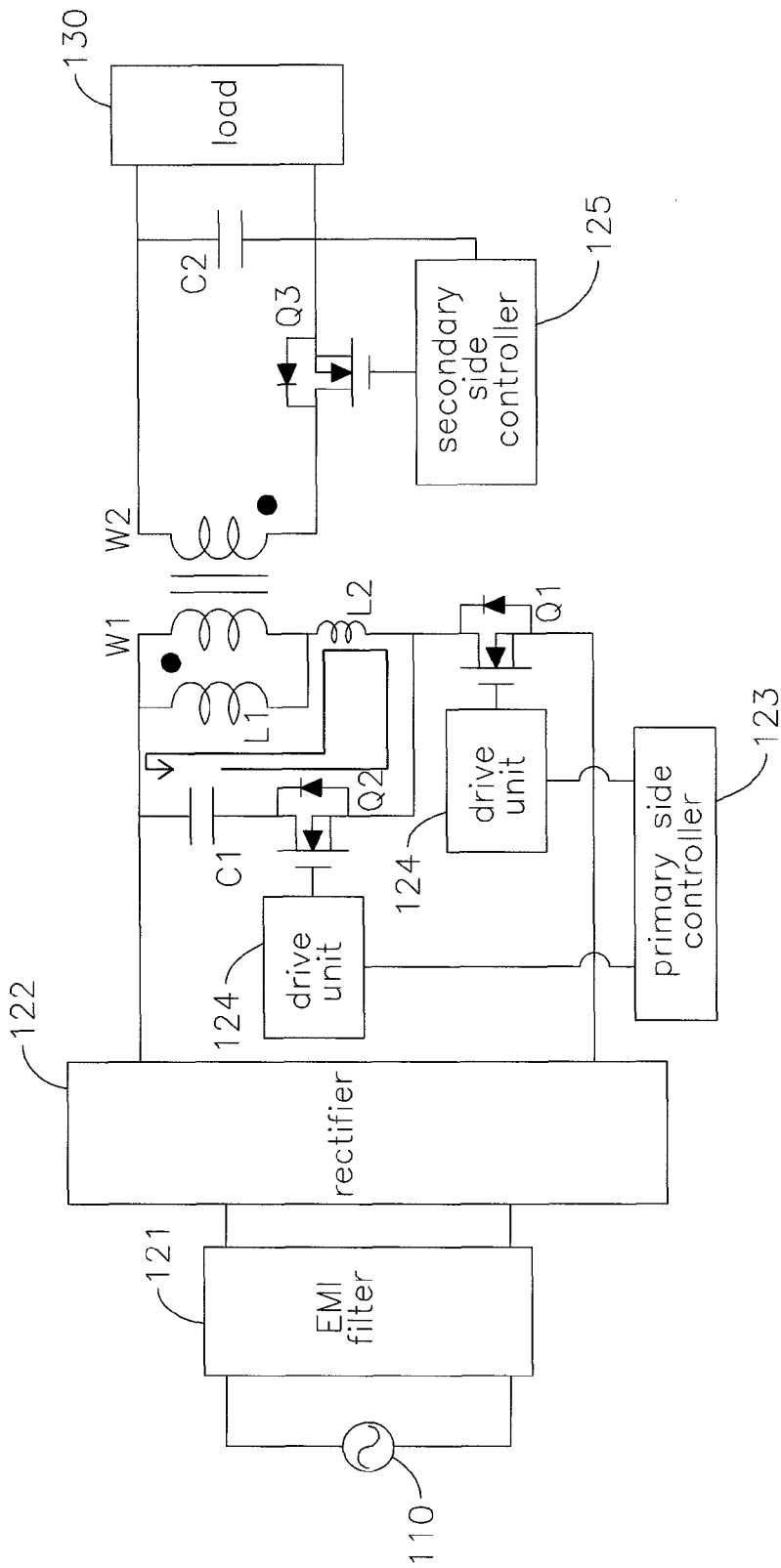
FIG. 18 is a current flow diagram during the time interval t2 to t3 of the conventional active clamp converter.
Figure 19:
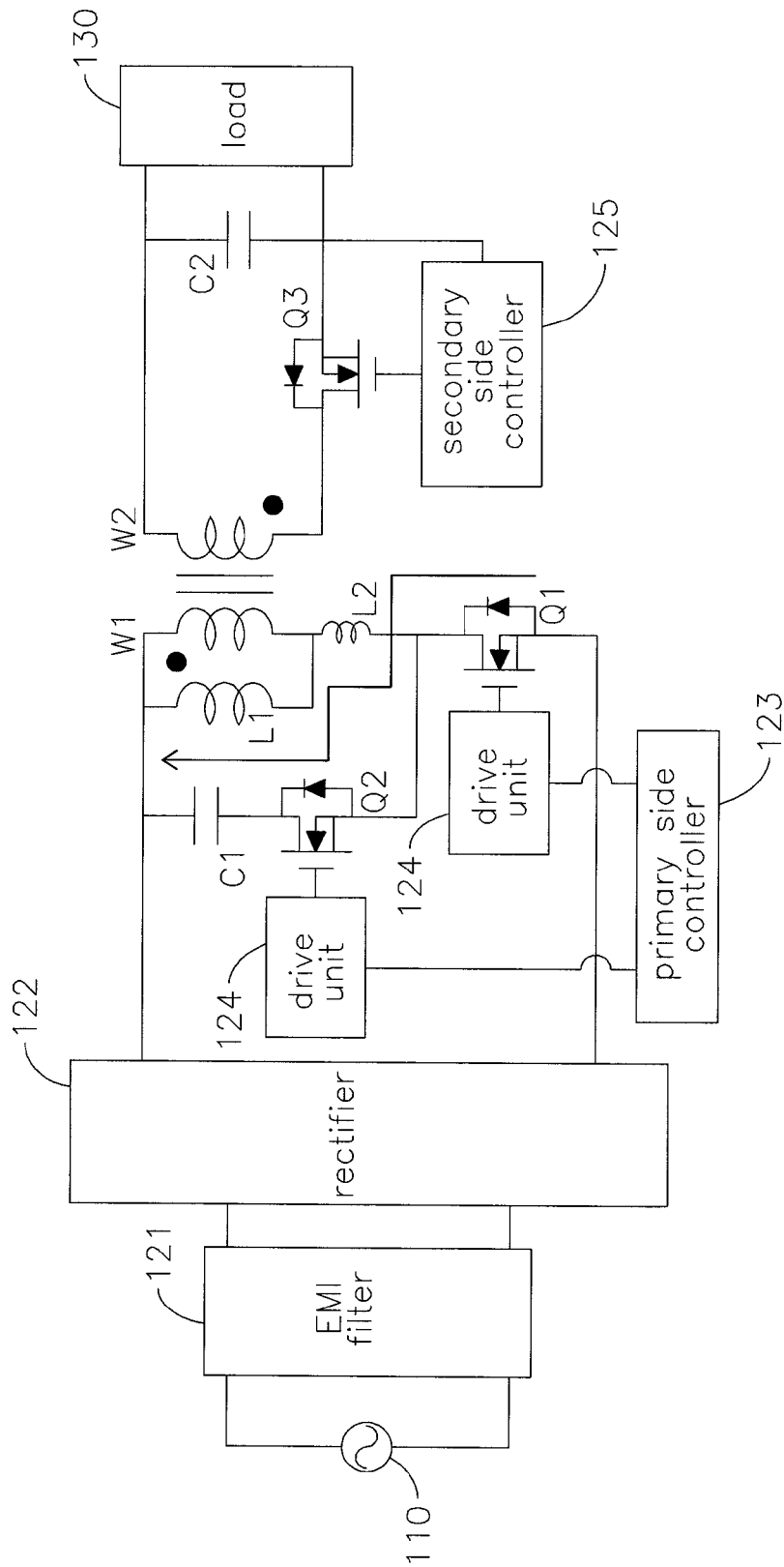
FIG. 19 is a current flow diagram during the time interval t3 to t4 of the conventional active clamp converter.

With reference to FIG. 10 to FIG. 12, in the third embodiment, the master control signal PWM1 and the auxiliary control signal PWM2 are complementary to each other and the primary side controller 23 detects the current flowing through the auxiliary switch Q2. When the current flowing through the auxiliary switch Q2 is less than zero ampere, the auxiliary switch Q2 is cut-off and the master switch Q1 is turned on. As shown in FIG. 10, the current is detected at the node at which the master switch Q1 and the auxiliary switch Q2 are connected. As shown in FIG. 12, in another embodiment, the current is detected at the DC positive terminal of the rectifier 22. Furthermore, in the preferred embodiment of FIG. 12, the detected current is fed back to the ACF module 231 via a leading-edge blanking unit.

With reference to FIG. 11, one terminal of the primary side capacitor C1 is electrically connected to the node at which the master switch Q1 and the primary side resistor R1 are connected. Thus the current flowing through the master switch Q1 and the auxiliary switch Q2 can be detected by the primary side resistor R1 for better controlling.

In the third embodiment, by detecting the current flowing through the auxiliary switch Q2, the master control signal PWM1 and the auxiliary control signal PWM2 are applied to turn off the auxiliary switch Q2 and turn on the master switch Q1 to reduce the switching loss when the current flowing through the auxiliary switch Q2 is less than zero ampere and the reverse current is generated.

Thus, preferred embodiments of the active clamp converter and control method have been disclosed. It should be apparent, however, to those skilled in the art that many more modifications besides those described are possible without departing from the invention concepts herein. The inventive subject matter, therefore, is not to be restricted in the spirit of the appended claims.

What is claimed is:

1. A control method for an active clamp converter, wherein the active clamp converter has a primary side comprising a master switch and an auxiliary switch, the method comprising the steps of:

detecting a state of a load of the active clamp converter;
determining whether the state of the load is a light-load state or not;
when the state of the load is the light-load state, a skipping mode is applied to generate a master control signal and an auxiliary control signal; wherein the master control signal controls the master switch to turn on and off, and the auxiliary control signal controls the auxiliary switch to turn on and off; wherein in the skipping mode, the switch frequencies of the master switch and the auxiliary switch are decreased when the state of the load is getting light;
when the state of the load is not the light-load state, an active clamp forward (ACF) mode is applied to generate the master control signal and the auxiliary control signal; wherein in the ACF mode the switch frequencies of the master switch and the auxiliary switch are adjusted for generating a reverse current when the state of the load is getting heavy, and the master switch is controlled to be turned on by the reverse current.

2. The control method as claimed in claim 1, wherein:
in the step of detecting the state of the load, a first signal is detected and an output current of the active clamp converter is calculated according to the first signal;
in the step of detecting whether the state of the load is the light-load state or not, when the output current is less than a threshold value and the switch frequency of the master switch equals a frequency threshold, the state of the load is identified as the light-load state.

3. The control method as claimed in claim 1, wherein the master control signal and the auxiliary control signal are pulse-width modulation signals;
the master switch and auxiliary switch are turned on when the master control signal and the auxiliary control signal are at a high level; and
the master switch and auxiliary switch are turned off when the master control signal and the auxiliary control signal are at a low level.

4. The control method as claimed in claim 2, wherein the master control signal and the auxiliary control signal are pulse-width modulation signals;
the master switch and auxiliary switch are turned on when the master control signal and the auxiliary control signal are at a high level; and
the master switch and auxiliary switch are turned off when the master control signal and the auxiliary control signal are at a low level.

5. The control method as claimed in claim 1, wherein in the skipping mode, the master control signal and the auxiliary control signal are complementary to each other;
when the state of the load is less than a first threshold value, the master control signal and the auxiliary control signal only remain in the first cycle of each N1 consecutive cycles, and are offset by a shield signal in the rest N1−1 cycles in said each N1 consecutive cycles;
when the state of the load is less than a second threshold value, the master control signal and the auxiliary control signal only remain in the first cycle of each N2 consecutive cycles, and are offset by a shield signal in the rest N2−1 cycles in said each N2 consecutive cycles; and
wherein N1<N2 and the first threshold value is greater than the second threshold value.

6. The control method as claimed in claim 2, wherein in the skipping mode, the master control signal and the auxiliary control signal are complementary to each other;
when the state of the load is less than a first threshold value, the master control signal and the auxiliary control signal only remain in the first cycle of each N1 consecutive cycles, and are offset by a shield signal in the rest N1−1 cycles in said each N1 consecutive cycles;
when the state of the load is less than a second threshold value, the master control signal and the auxiliary control signal only remain in the first cycle of each N2 consecutive cycles, and are offset by a shield signal in the rest N2−1 cycles in said each N2 consecutive cycles; and
wherein N1<N2 and the first threshold value is greater than the second threshold value.

7. The control method as claimed in claim 1, wherein in the skipping mode:
the master control signal and the auxiliary control signal have a same cycle T1+T2+T3, wherein T1 is a pulse-width of the master control signal, T2 is a pulse-width of the auxiliary control signal, and T3 is a turn-off delay time.

8. The control method as claimed in claim 2, wherein in the skipping mode:
the master control signal and the auxiliary control signal have a same cycle T1+T2+T3, wherein T1 is a pulse-width of the master control signal, T2 is a pulse-width of the auxiliary control signal, and T3 is a turn-off delay time.

9. The control method as claimed in claim 2, wherein in the ACF mode, the master control signal and the auxiliary control signal are complementary to each other and a comparison table of parameters is established, the comparison table comprises voltage parameters and current parameters, the voltage parameters correspond to an input voltage of the active clamp converter, and the current parameters correspond to the output current of the active clamp converter;
wherein the switch frequency is determined by an equation $$Fsw=Kv \times Vin + Ki \times Iout,$$

Fsw is the switch frequency, Kv is the voltage parameter, Vin is the input voltage, Ki is the current parameter and is negative, and Iout is the output current.

10. The control method as claimed in claim 4, wherein in the ACF mode, the master control signal and the auxiliary control signal are complementary to each other and a comparison table of parameters is established, the comparison table comprises voltage parameters and current parameters, the voltage parameters correspond to an input voltage of the active clamp converter, and the current parameters correspond to the output current of the active clamp converter;
wherein the switch frequency is determined by an equation $$Fsw=Kv \times Vin + Ki \times Iout,$$

Fsw is the switch frequency, Kv is the voltage parameter, Vin is the input voltage, Ki is the current parameter and is negative, and Iout is the output current.

11. The control method as claimed in claim 1, wherein in the ACF mode, the master control signal and the auxiliary control signal are complementary to each other, and a current flowing through the master switch is sampled;
when the sampled current is greater than zero ampere, the switch frequency of the master switch in the next cycle will be decreased;

when the sampled current is less than zero ampere, the switch frequency of the master switch in the next cycle will be increased;

when a sample feedback signal is equal to zero ampere, the switch frequency of the master switch in the next cycle will be held.

12. The control method as claimed in claim 2, wherein in the ACF mode, the master control signal and the auxiliary control signal are complementary to each other, and a current flowing through the master switch is sampled;

when the sampled current is greater than zero ampere, the switch frequency of the master switch in the next cycle will be decreased;

when the sampled current is less than zero ampere, the switch frequency of the master switch in the next cycle will be increased;

when a sample feedback signal is equal to zero ampere, the switch frequency of the master switch in the next cycle will be held.

13. The control method as claimed in claim 1, wherein in the ACF mode, the master control signal and the auxiliary control signal are complementary to each other, and a current flowing through the master switch is sampled;

the master switch is turned on when the sampled current is less than zero ampere and a reverse current is generated.

14. An active clamp converter connected between an alternating current (AC) power supply and a load, the active clamp converter comprising:

a rectifier having a DC positive terminal and a DC negative terminal;

an electromagnetic interference filter electrically connected between the alternating current power supply and the rectifier;

a primary side coil;

a master switch;

a primary side resistor, wherein the primary side coil, the master switch and the primary side resistor are connected in series between the DC positive terminal and the DC negative terminal of the rectifier;

a primary side capacitor;

an auxiliary switch connected in series with the primary side capacitor, wherein the auxiliary switch and the primary side capacitor are then connected in parallel with the primary side coil;

the primary side coil connected between the DC positive terminal of the rectifier and a node at which the master switch and the auxiliary switch are connected;

a primary side controller connected to a control terminal of the master switch and a control terminal of the auxiliary switch;

a secondary side switch;

a secondary side coil coupled with the primary side coil, wherein a loop circuit is formed by the secondary side coil, the secondary side switch and the load;

a secondary side controller connected to a control terminal of the secondary side switch;

a compensator connected to the secondary side coil and the primary side controller to generate a compensating signal output to the primary side controller;

wherein the primary side controller detects a state of the load, when the state of the load is a light-load state, a skipping mode is applied; when the state of the load is not the light-load state, an ACF mode is applied;

wherein the skipping mode is to decrease the switch frequency of the master switch and the auxiliary switch when the state of the load is getting light;

wherein the ACF mode is to adjust the switch frequency of the master switch and the auxiliary switch for generating a reverse current to control the master switch when the state of the load is getting heavy.

15. The active clamp converter as claimed in claim 14, wherein the primary side controller generates a master control signal for turning on and off the master switch and an auxiliary control signal for turning on and off the auxiliary switch;

in the ACF mode, the master control signal and the auxiliary control signal are complementary to each other, and a current flowing through the master switch is sampled by a reverse current detector;

when the sampled current is greater than zero ampere, the switch frequency of the master switch in the next cycle will be decreased;

when the sampled current is less than zero ampere, the switch frequency of the master switch in the next cycle will be increased;

when the sampled current is equal to zero ampere, the switch frequency of the master switch in the next cycle will be held.

16. The active clamp converter as claimed in claim 14, wherein the primary side controller generates a master control signal for turning on and off the master switch and an auxiliary control signal for turning on and off the auxiliary switch;

in the ACF mode, the master control signal and the auxiliary control signal are complementary to each other, and a current flowing through the auxiliary switch is detected at a node at which the master switch and the auxiliary switch are connected, and the master switch is turned on when a current flowing through the master switch is less than zero ampere and the reverse current is generated.

17. The active clamp converter as claimed in claim 14, wherein the primary side controller generates a master control signal for turning on and off the master switch and an auxiliary control signal for turning on and off the auxiliary switch;

in the ACF mode, the master control signal and the auxiliary control signal are complementary to each other and a current flowing through the auxiliary switch is detected at the DC positive terminal of the rectifier, and the master switch is turned on when a current flowing through the master switch is less than zero ampere and the reverse current is generated.

18. An active clamp converter electrically connected between an alternating current power supply and a load, the active clamp converter comprising:

a rectifier having a DC positive terminal and a DC negative terminal;

an electromagnetic interference filter eclectically connected between the alternating current power supply and the rectifier;

a primary side coil;

a master switch;

a primary side resistor, wherein the primary side coil, the master switch and the primary side resistor are connected in series between the DC positive terminal and the DC negative terminal of the rectifier;

a primary side capacitor;

an auxiliary switch connected in series with the primary side capacitor, wherein the auxiliary switch and the primary side capacitor are then connected in parallel with the primary side coil;

a primary side controller connected to a control terminal of the master switch and a control tell final of the auxiliary switch;

a secondary side switch;

a secondary side coil coupled with the primary side coil, wherein a loop circuit is formed by the secondary side coil, the secondary side switch and the load;

a secondary side controller connected to a control terminal of the secondary side switch;

a compensator connected to the secondary side coil and the primary side controller to generate a compensating signal output to the primary side controller;

wherein when a state of the load is getting heavy, the primary side controller changes the switch frequency of the master switch and the auxiliary switch for generating a reverse current.

19. The active clamp converter as claimed in claim 18, wherein the primary side controller generates a master control signal for turning on and off the master switch and an auxiliary control signal for turning on and off the auxiliary switch;

in the ACF mode, the master control signal and the auxiliary control signal are complementary to each other, and a current flowing through the master switch is sampled by a reverse current detector;

when the sampled current is greater than zero ampere, the switch frequency of the master switch in the next cycle will be decreased;

when the sampled current is less than zero ampere, the switch frequency of the master switch in the next cycle will be increased;

when the sampled current is equal to zero ampere, the switch frequency of the master switch in the next cycle will be held.

20. The active clamp converter as claimed in claim 18, wherein the primary side controller generates a master control signal for turning on and off the master switch and an auxiliary control signal for turning on and off the auxiliary switch;

in the ACF mode, the master control signal and the auxiliary control signal are complementary to each other, and a current flowing through the auxiliary switch is detected at a node at which the master switch and the auxiliary switch are connected, and the master switch is turned on when a current flowing through the master switch is less than zero ampere and the reverse current is generated.

* * * * *